United States Patent
Striegel et al.

(10) Patent No.: US 10,383,002 B2
(45) Date of Patent: Aug. 13, 2019

(54) SYSTEMS AND METHODS FOR RAPIDLY ESTIMATING AVAILABLE BANDWIDTH IN A WIFI LINK

(71) Applicant: University of Notre Dame du Lac, Notre Dame, IN (US)

(72) Inventors: Aaron Striegel, Granger, IN (US); Lixing Song, Notre Dame, IN (US)

(73) Assignee: University of Notre Dame du Lac, Notre Dame, IN (US)

( * ) Notice: Subject to any disclaimer, the term of this patent is extended or adjusted under 35 U.S.C. 154(b) by 0 days.

(21) Appl. No.: 15/967,532

(22) Filed: Apr. 30, 2018

(65) Prior Publication Data

US 2018/0317131 A1    Nov. 1, 2018

Related U.S. Application Data

(60) Provisional application No. 62/492,397, filed on May 1, 2017, provisional application No. 62/492,578, filed on May 1, 2017.

(51) Int. Cl.
*H04W 28/06* (2009.01)
*H04L 12/801* (2013.01)
(Continued)

(52) U.S. Cl.
CPC ....... *H04W 28/065* (2013.01); *H04L 43/0882* (2013.01); *H04L 43/0894* (2013.01);
(Continued)

(58) Field of Classification Search
CPC ............... H04L 43/045; H04L 43/0882; H04L 43/0894; H04L 43/16; H04L 43/50;
(Continued)

(56) References Cited

U.S. PATENT DOCUMENTS 7,573,857 B1    8/2009  Radhakrishnan et al.
7,864,736 B2    1/2011  Yashar et al.
(Continued)

FOREIGN PATENT DOCUMENTS

CN    105491642 A    4/2016
CN    105657760 A    6/2016
(Continued)

OTHER PUBLICATIONS

C.D. Mano et al., "RIPPS," ACM Transactions on Information and Systems Security, vol. 11, No. 2, Article 6, pp. 1-23 (May 2008).
(Continued)

*Primary Examiner* — Stephen J Clawson
(74) *Attorney, Agent, or Firm* — Michael Best & Friedrich LLP

(57) ABSTRACT

Systems and methods for determining an available bandwidth in a WiFi link using frame aggregation. One system includes an electronic processor configured to send a request for a probe sequence from a server to an electronic communication device. The electronic processor is configured to receive a probe sequence via the WiFi link and determine an aggregation intensity parameter, the aggregation intensity parameter associated with a number of packets assembled in an aggregated frame for the WiFi link. In response to the aggregation intensity parameter being above a threshold, the electronic processor determines an available bandwidth of the WiFi link is less than a probe rate.

17 Claims, 15 Drawing Sheets

(51) Int. Cl.
*H04W 24/02* (2009.01)
*H04L 12/26* (2006.01)
*H04L 29/06* (2006.01)

(52) U.S. Cl.
CPC ............ *H04L 43/50* (2013.01); *H04L 47/115* (2013.01); *H04L 65/80* (2013.01); *H04W 24/02* (2013.01); *H04L 43/045* (2013.01); *H04L 43/16* (2013.01)

(58) Field of Classification Search
CPC ...... H04L 47/115; H04L 65/80; H04W 24/00; H04W 25/02; H04W 28/065
See application file for complete search history.

(56) References Cited

U.S. PATENT DOCUMENTS

| | | | |
|---|---|---|---|
| 8,988,999 | B2 | 3/2015 | Sirotkin |
| 9,788,269 | B2 | 10/2017 | Gokhale |
| 10,164,867 | B2 * | 12/2018 | Thubert ............... H04L 45/18 |
| 2002/0181394 | A1 * | 12/2002 | Partain ............... H04L 41/0896 370/229 |
| 2004/0039817 | A1 | 2/2004 | Lee et al. |
| 2006/0252443 | A1 | 11/2006 | Sammour et al. |
| 2008/0102852 | A1 | 5/2008 | Du et al. |
| 2009/0013210 | A1 * | 1/2009 | McIntosh ............ H04L 41/0672 714/4.1 |
| 2009/0303871 | A1 | 12/2009 | Kim et al. |
| 2012/0294181 | A1 * | 11/2012 | Ekelin ................ H04L 41/0896 370/252 |
| 2013/0090517 | A1 * | 4/2013 | Van den Heuvel ......................... A61N 1/37264 600/25 |
| 2013/0142095 | A1 | 6/2013 | Calcev et al. |
| 2013/0329620 | A1 | 12/2013 | Kim et al. |
| 2015/0036673 | A1 | 2/2015 | Asterjadhi et al. |
| 2015/0063111 | A1 | 3/2015 | Merlin et al. |
| 2015/0146648 | A1 | 5/2015 | Viger et al. |
| 2015/0289201 | A1 | 10/2015 | Stupar et al. |
| 2015/0350974 | A1 | 12/2015 | Patil et al. |
| 2015/0351026 | A1 | 12/2015 | Lee et al. |
| 2016/0066227 | A1 | 3/2016 | Townend |
| 2016/0112984 | A1 | 4/2016 | Patil et al. |
| 2016/0142163 | A1 | 5/2016 | Sirotkin |
| 2017/0111821 | A1 | 4/2017 | Sivakumar et al. |
| 2017/0111854 | A1 | 4/2017 | Ho et al. |
| 2017/0111951 | A1 | 4/2017 | Chu et al. |
| 2017/0181045 | A1 | 6/2017 | Sen et al. |
| 2017/0288996 | A1 * | 10/2017 | Farrow ................. H04L 43/087 |
| 2018/0034740 | A1 * | 2/2018 | Beliveau ............ H04L 43/0852 |
| 2018/0063748 | A1 * | 3/2018 | Ling ................... H04L 43/0894 |
| 2018/0092111 | A1 * | 3/2018 | Chaudhuri ............ H04L 5/0048 |

FOREIGN PATENT DOCUMENTS

| | | |
|---|---|---|
| CN | 106487476 A | 3/2017 |
| KR | 20180026518 A | 3/2018 |
| WO | 2014/023337 A1 | 2/2014 |

OTHER PUBLICATIONS

J. Walraevens et al., "A Discrete-time Priority Queue with Train Arrivals," Stochastic Model, 23, pp. 489-512 (2007).

J. Strauss et al., "A Measurement Study of Available Bandwidth Estimation Tools," IMC '03 ACM Press.

A. Botta et al., "A Tool for the Generation of Realistic Network Workload for Emerging Networking Scenarios," Computer Networks, 56, pp. 3531-3547 (2012).

A. Fashad et al., "On the Impact of 802.11n Frame Aggregation on End-To-End Available Bandwidth Estimation," SECON, IEEE, pp. 108-116 (Jun. 2014).

B.D. Choi., "Priority Queueing System with Fixed-Length Packet-Train Arrivals," IEEE Proceedings Communications, vol. 145, No. 5, pp. 331-336 (Oct. 1998).

S. Savage, "Sting: A TCP-based Network Measurement Tool," USENIX Symposium on Internet Technologies and Systems, vol. 2, pp. 1-9 (1999).

S. Hemminger, "Network Emulation with NetEm," Linux Conf Au (Apr. 2005).

V.J. Ribeiro et al., "PathChirp: Efficient Available Bandwidth Estimation for Network Plans," No. SLAC-PUB-9732 (Apr. 2003).

J. Kolap et al., "Frame Aggregation Mechanism for High-Throughput 802.11n Wlans," International Journal of Wireless & Mobile Networks (IJWMN), vol. 4, No. 3, pp. 141-153 (Jun. 2012).

* cited by examiner

SYSTEMS AND METHODS FOR RAPIDLY ESTIMATING AVAILABLE BANDWIDTH IN A WIFI LINK

RELATED APPLICATIONS

This application claims priority to U.S. Provisional Application No. 62/492,578, filed May 1, 2017, and U.S. Provisional Application No. 62/492,397 filed May 1, 2017, the entire content of both is incorporated by reference herein.

FEDERAL FUNDING LEGEND

This invention was made with Government Support under Federal Grant No. 1439682 awarded by the NSF. The Government has certain rights to this invention.

FIELD

Embodiments described herein relate to estimating WiFi available bandwidth in a WiFi link using frame aggregation.

BACKGROUND

With the advent of the smartphone and numerous mobile devices, wireless data usage has exploded over the past decade. WiFi has emerged as a pivotal technology for mobile devices offering the potential for exceptional connectivity speeds. Network operators are faced with meeting wireless demands with WiFi ranking as one of the critical technologies to meet those demands. In fact, nearly all mobile devices try in some form to push users to WiFi to deliver what is predicted to be a better user Quality of Experience (QoE). In some embodiments, from the standpoint of the user, the general desire is for the network connectivity to simply work. Improved cellular connectivity over the past few years has made the choice of cellular versus WiFi more of an economic choice rather than that of a performance choice, particularly with public WiFi. This narrowing of the performance gap has made poor WiFi performance all the more stark in terms of interrupting the seamless connectivity experience for the user. Further, such narrowing will only be more pronounced as emerging efforts, such as Hotspot 2.0 (Passpoint) and Access Network and Discovery Services Function (ANDSF), greatly increase WiFi usage outside of the home. The performance of WiFi may vary significantly making WiFi link characterization (and more broadly the path characterization) a critical element of the user Quality of Experience (QoE).

SUMMARY

The following presents a simplified summary of one or more implementations of the present disclosure to provide a basic understanding of such implementations. This summary is not an extensive overview of all contemplated implementations and is intended to neither identify key or critical elements of all implementations nor delineate the scope of any or all implementations. The sole purpose of this summary is to present some concepts of one or more implementations of the present disclosure in a simplified form as a prelude to the more detailed description that is presented later.

One metric to determine whether WiFi will be positive or negative for the user QoE is an accurate characterization of the WiFi link and the overarching path. Whether said characterization involves exploring the performance of candidate WiFi networks or longitudinal assessment via crowdsourcing, an important property of any WiFi link is the ability to operate in an accurate and efficient manner. Test approaches, such as iperf and Speedtest, represent Achievable Throughput (AT) tests that test a link by measuring instantaneous Transmission Control Protocol (TCP) throughput. Typically, this category of tests often take on the order of seconds with significant energy and bandwidth costs, which makes these tests a poor choice for rapid characterization and a sub-optimal choice for longitudinal testing. However, most path characterization techniques tend to be expensive in terms of time, bandwidth, and energy.

Embodiments described herein address the above shortcomings. Systems and methods provided herein use sliced, structured, and reordered packet sequences along with awareness of frame aggregation to rapidly characterize available bandwidth. The available bandwidth is characterized within the context of a single web request (for example, a Hypertext transfer protocol (HTTP) GET) method, which consumes limited downlink data with resolution of the path characteristics typically occurring in under a second. Compared to conventional systems that provide Achievable Bandwidth (AT) measurement, determining Available Bandwidth using the methods and systems described above is light-weight, fast and less intrusive.

In contrast, Available Bandwidth (AB) testing attempts to discern the residual or remaining capacity on a path or link by analyzing the timing patterns from a sequence of packets. For example, adaptive media streaming services, such as HTTP live streaming, can use Available Bandwidth estimation to adjust the bitrate for transmission. With the ability to associate a client to multiple access points (APs), multipath TCP (MPTCP) uses available bandwidth estimation to decide the load assignment on each subflow. Available Bandwidth tests are often more efficient and arrive more quickly at results as compared to Achievable Throughput tests and with significantly less bandwidth cost. Unfortunately, the very timing patterns that allow AB tests to operate more efficiently tend to struggle with the increased noise in wireless systems and are not functional under modern WiFi variants (802.11n, 802.11ac) that utilize Frame Aggregation (FA).

However, as discussed herein, the scheduling variations that are introduced by frame aggregation can be leveraged to deliver a rich set of insight with regards to the underlying utilization and available bandwidth of a WiFi link. In contrast to prior work that attempts to engineer around frame aggregation (described by A. Farshad, M. Lee, M. K. Marina, and F. Garcia in June 2014 entitled "On the impact of 802.11n frame aggregation on end-to-end available bandwidth estimation." in SECON, IEEE, incorporated herein by reference), embodiments described herein intentionally induce frame aggregation to rapidly and accurately characterize the available bandwidth of a WiFi link. Also, the intrinsic properties of frame aggregation allow for the detection of congestion and create a proof of concept system, AIWC (Aggregation Intensity based WiFi Characterization). AIWC possesses robustness across varying bandwidth levels, interference, and traffic patterns, and frame aggregation embodies a rich set of WiFi link characteristics with the queuing effects at the specific AP being of particular interest. Also, inducing frame aggregation can be induced to measure link congestion and in turn to measure the available bandwidth. The concept of Aggregation Intensity (AI) can also be used to capture frame depth, which can be manipulated with targeted packet sequences to capture the likely AB. Additionally, embodiments described here provide a proof of concept AIWC system that realizes the proposed approach through a libpcap-based server with customized TCP flows. The methods and systems provided herein operate in-band within TCP to avoid modifications to the end client by leveraging components from TCP (described by S. Savage in 1999 entitled "Sting: A TCP-based Network Measurement Tool," in USENIX Symposium on Internet Technologies and Systems, vol. 2, incorporated herein by reference; and C. D. Mano, A. Blaich, Q. Liao, Y. Liang, D. A. Cieslak, D. C. Salyers, and A. Striegel, in 2008 entitled "RIPPS" in ACM Transactions on Information and System Security, vol. 11, no. 2, pp. 1-23, incorporated herein by reference). The proposed AIWC is also robust across varying bandwidth levels, interference, and traffic patterns, and provides performance improvements versus the existing body of Available Bandwidth literature [(Farshad)].

One challenge that emerges with respect to link characterization is how to characterize performance in an efficient manner. Embodiments provided herein explore how the existing frame aggregation mechanisms introduced by 802.11e can be leveraged to achieve such a goal. Examples show not only how frame aggregation breaks existing lightweight mechanisms for link characterization but also how to carefully construct packet sequences that induce frame aggregation to capture the WiFi available bandwidth. Examples show a proof of concept system, AIWC (Aggregation Intensity based WiFi Characterization), to demonstrate the afore-mentioned concepts with significant improvements versus prior work.

Embodiments described herein include, among other things, a software application which enables users to determine the available bandwidth over a WiFi link using frame aggregation such as, for example, aggregated media access control (MAC) protocol data unit (A-MPDU).

For example, an example embodiment includes an electronic communication device for determining an available bandwidth in an WiFi link using frame aggregation between an access point and the electronic communication device. The electronic communication device includes an electronic processor. The electronic processor is configured to send a request for a probe sequence. The electronic processor is also configured to receive a probe sequence via the WiFi link. The electronic processor is also configured to determine an aggregation intensity parameter, the aggregation intensity parameter associated with a number of packets assembled in an aggregated frame for the WiFi link. The electronic processor is further configured to determine that an available bandwidth of the WiFi link is less than a probe rate in response to the aggregation intensity parameter being above a threshold.

Another example embodiment includes a method for determining available bandwidth in a WiFi link using frame aggregation between an access point and an electronic communication device. The method includes sending a probe sequence over the WiFi link, wherein the probe sequence includes a plurality of data packets having a fixed packet size and packet gap. The method also includes receiving, with the computing device, the probe sequence via the WiFi link. The method also includes determining an aggregation intensity parameter, the aggregation intensity parameter associated with a number of packets assembled in an aggregated frame for the WiFi link. The method also includes determining that the available bandwidth of the WiFi link is less than a probe rate in response to the aggregation intensity parameter being above a threshold. The method also includes displaying, with a display, the available bandwidth of the WiFi link.

Another example embodiment includes a non-transitory computer-readable medium containing instructions that when executed by one or more electronic processors cause the one or more electronic processors to perform the steps of sending a probe sequence over the WiFi link, wherein the probe sequence includes a plurality of data packets having a fixed packet size and packet gap; receiving, with the computing device, the probe sequence via the WiFi link; determining an aggregation intensity parameter, the aggregation intensity parameter associated with a number of packets assembled in an aggregated frame for the WiFi link; determining that the available bandwidth of the WiFi link is less than a probe rate in response to the aggregation intensity parameter being above a threshold; and displaying, with a display, the available bandwidth of the WiFi link By the use of the techniques disclosed herein, one or more devices can be configured to, among other things, conserve resources with respect to power resources, memory resources, communications bandwidth resources, processing resources, and/or other resources while providing mechanisms for controlling and deleting personally identifiable information in content such as documents, audio, and image data. For example, as described in more detail below, the embodiments described herein differ from current technology in the market by providing a quicker technical solution that consumes less bandwidth and energy and is lighter than current technology relating to detecting WiFi link characteristics. Technical effects other than those mentioned herein can also be realized from an implementation of the technologies disclosed herein.

BRIEF DESCRIPTION OF THE DRAWINGS

The present disclosure will be better understood from the following detailed description read in light of the accompanying drawings, wherein like reference numerals are used to designate like parts in the accompanying description.

DETAILED DESCRIPTION

For the purposes of promoting an understanding the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

As described above, one challenge that emerges with respect to link characterization is how to characterize performance in an efficient manner. Embodiments described herein disclose how frame aggregation mechanisms can be leveraged to achieve such a goal. Discussed herein is not only how frame aggregation breaks existing lightweight mechanisms for link characterization but also how to carefully construct packet sequences that induce frame aggregation to capture the WiFi available bandwidth. Also discussed herein is a proof of concept system, AIWC (Aggregation Intensity based WiFi Characterization), to demonstrate the afore-mentioned concepts and how the system provides improvements over prior work.

Before discussing the details of the embodiments, an overview of frame aggregation and available bandwidth estimation is provided.

A. Frame Aggregation Overview

Figure 1:
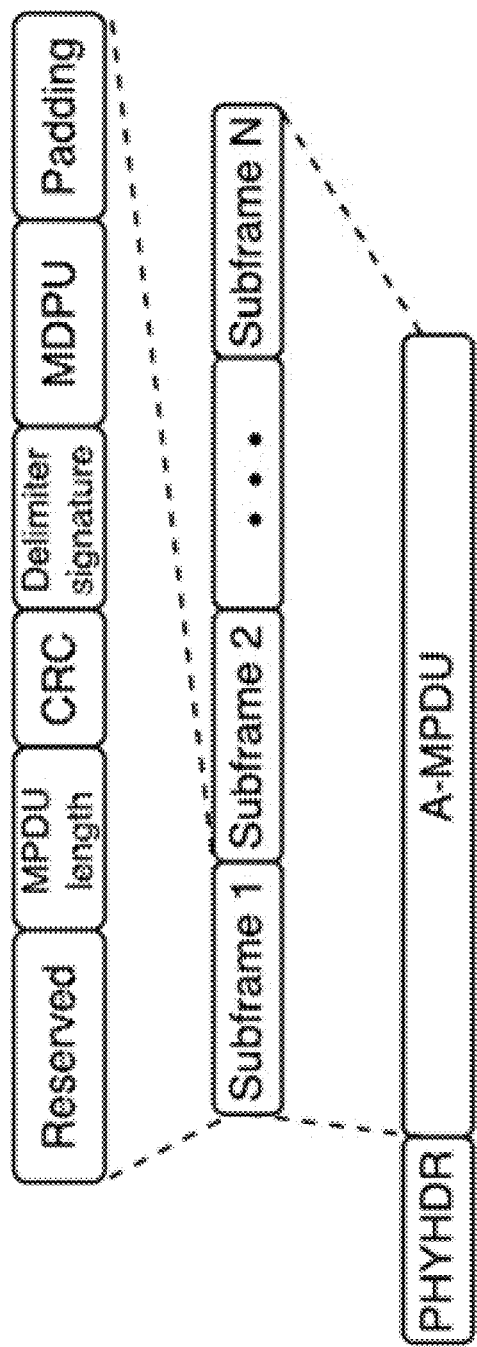
FIG. 1 illustrates an example of a frame format using A-MPDU.

The technique of frame aggregation was proposed in 802.11e for the purpose of increasing the WiFi throughput. By assembling multiple packets for transmission as one aggregated frame, the overhead of the physical header is reduced as multiple packets share one header. In tandem with Block Acknowledgement (BA), only one acknowledgement (ACK) at the MAC layer is required to respond per aggregated frame, which improves the MAC layer efficiency. Frame aggregation can be operated at two levels: at the aggregate MAC protocol service unit (A-MSDU) and at the aggregate MAC protocol data unit (A-MPDU). The general principle is to allow multiple data units that are destined to the same receiver to be assembled and sent out as one aggregated frame. As an example, FIG. 1 illustrates the components of an A-MPDU frame. The same principle is applicable to A-MSDU with a different unit (MSDU) as the subframe. The two aggregation mechanisms are operated at different levels with the A-MSDU near the top of the MAC layer and the A-MPDU near the bottom of the MAC layer. These two mechanisms may be employed together as specified in 802.11n/ac (described by J. Kolap, S. Krishnan, and N. Shaha, in 2012 entitled "Frame aggregation mechanism for high-throughput 802.11n wlans," *International Journal of Wireless & Mobile Networks (IJWMN)*). Overall, when forming an aggregated frame, the two-level aggregation process first needs to wait for the transmission of previous packets in the queue if any; then hold for an additional pre-defined delay to wait for any incoming traffic that is destined for the same address. The aggregation is complete if any of the three conditions occur: 1) the size of aggregated frame reaches the maximum ($\mathcal{P}_{max\,max}$); 2) the estimated transmission time of the aggregated frame reaches the maximum ($\mathcal{T}_{max\,max}$); or 3) timeout of the pre-defined delay ($\mathcal{D}_{ag\,ag}$).

B. Available Bandwidth Estimation

Before introducing the metric Available Bandwidth (AB), Achievable Throughput (AT) is discussed. Conceptually, Achievable Throughput measures the maximum bandwidth that the TCP flow(s) can achieve by aggressively consuming bandwidth. Achievable Throughput estimation exhibits strong intrusiveness by temporarily and partially suppressing existing traffic. Moreover, Achievable Throughput techniques (for example, iperf3 or speedtest.net) tend to be expensive in terms of both time and bandwidth, with costs on the order of tens of seconds and tens of megabytes of data. These costs make Achievable Throughput largely unsuitable for being performed frequently and/or longitudinally.

In contrast to Achievable Throughput, Available Bandwidth (AB) is defined as the spare or residual capacity of a link during a time window. For an end-to-end path, Available Bandwidth refers to the available bandwidth of the narrow link that has the minimum available bandwidth. The narrow link is different from a tight link where minimal capacity occurs. Given a L-hop end-to-end path with $C_i$ (i=1, ..., L) as the link capacity of i-th link and $\bar{u}_i$ (t−T, t) is the average utilization of the link from time t−T to t, one can define the instantaneous available bandwidth AB(t) at time t for the path as:

$$AB(t) = \min_{i=1,\ldots,L} Ci(1 - \overline{u_i}(t - \tau, t)) \qquad (1)$$

Relatively speaking, AB techniques are riendlier, preferring to nudge the residual capacity of the bottleneck link rather than consistently competing with existing flows. Available Bandwidth techniques accomplish this by creating a series of short traffic bursts that each only last for only a few milliseconds. Thus, Available Bandwidth methods can be exceptionally lightweight and un-intrusive to the existing traffic.

The general method to estimate Available Bandwidth is probing from a sender to a receiver. By analyzing the characteristics of received packets with the corresponding sent packets, the available bandwidth on the path from sender to receiver can be approximated. Generally, existing works can be classified into two categories: the PRM (Packet Rate Model) and the PGM (Packet Gap Model). The notion of PRM is based on the concept of self-induced congestion. By comparing the probe packet rate with received packet rate, one can detect link congestion if the received packet rate is less than the probe rate, for example, $\mathcal{R}_{rcv} < \mathcal{R}_{rcv}$; otherwise, the link is not congested. Thus, the available bandwidth can be discerned by searching the point at which link congestion starts to occur.

In contrast to PRM, PGM exploits the gap information of the received packet ($\mathcal{G}_{rcv}$) to infer the cross traffic. For example, when a pair of packets with send gap $\mathcal{G}_{snd}$ is passed through a link with a capacity of C, the received packet gap is measured as $\mathcal{G}_{rcv}$. Assuming the queue is not empty between the departure of the first packet and the arrival of the second packet, the time to transmit the cross traffic can be inferred with $\Delta G = G_{rcv} - G_{snd}$. Thus, the available bandwidth can be computed as $$c\left(1 - \frac{\Delta G}{Gsnd}\right).$$

In summary, it can be seen that both of the methods heavily rely on the fact that, the received packet rate or packet gap should be an effective indicator to reveal the temporal cross traffic. The observations rely on packets being scheduled in a first-in-first-out (FIFO) manner and on a per-packet basis.

C. Available Bandwidth Estimation Under the Impact of Frame Aggregation

Unfortunately, under frame aggregation, the assumption of FIFO per-packet based scheduling may not hold. The aggregated transmissions behave like a batch scheduler that dramatically distorts the timing characteristics of received packets. To understand how frame aggregation affects Available Bandwidth estimation the following experiment is conducted.

Consider a traditional probe sequence with a fixed packet size and packet gap transmitted over a congested WiFi link. After the probes pass through the WiFi link, one can calculate the packet gap and packet rate at the receiver. Particularly, the packet rate can be computed with two methods: naive (dividing packet size by packet gap) and jumbo-based idea discussed in Farshad suggested considering aggregated packets as a single jumbo packet for calculating packet rate. A jumbo packet can be recognized by finding a series of consecutive packets whose packet gaps under certain threshold (for example, 300 μs).

Figure 2:
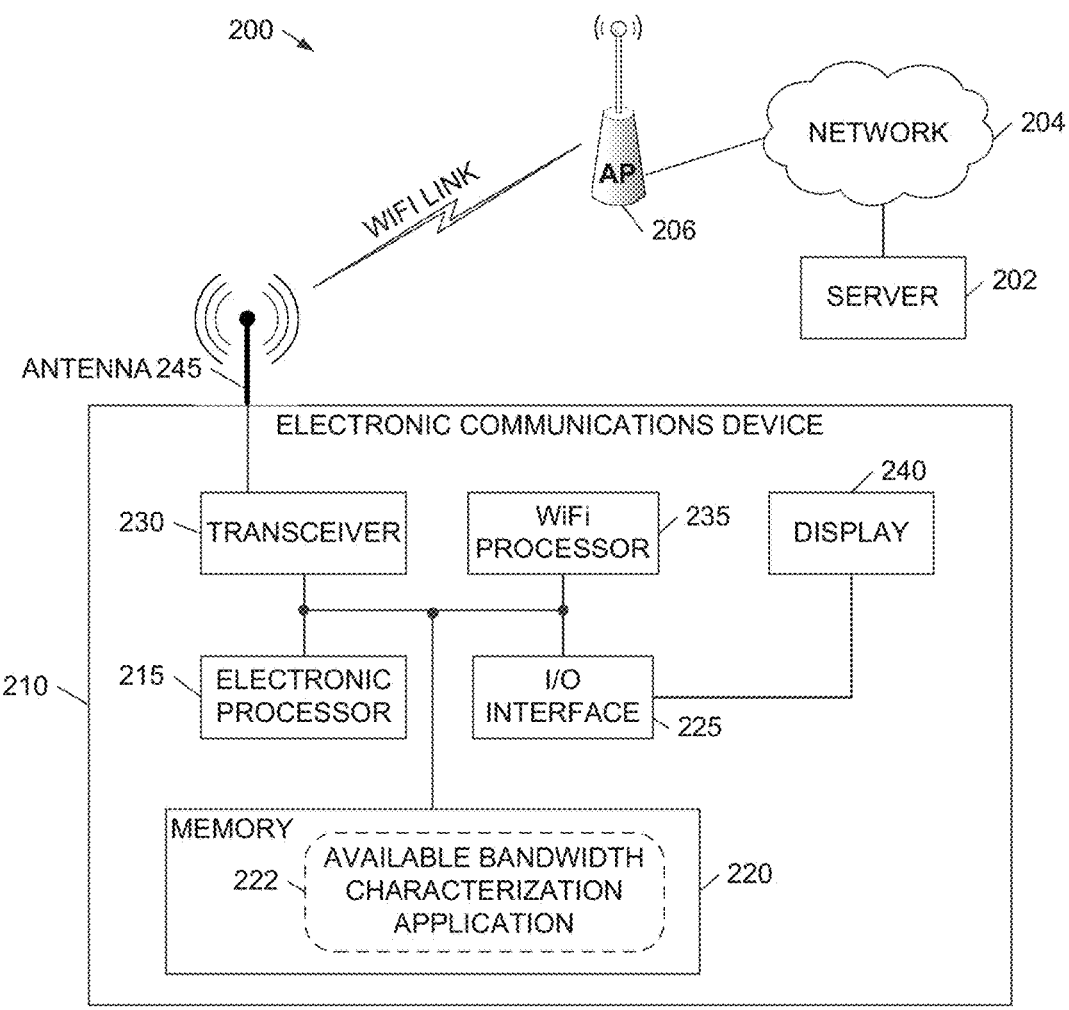
FIG. 2 is a diagram of a system for estimating WiFi available bandwidth in a WiFi link using frame aggregation in accordance with some embodiments.

FIG. 2 is a diagram of a system 200 for estimating WiFi available bandwidth in a WiFi link using frame aggregation, in accordance with some embodiments. The system 200 includes a server 204, a network 204, an access point 206, and an electronic communications device 210. In some embodiments, the WiFi link is established between the access point 206 and the electronic communications device 210 in accordance with protocols specified in the IEEE 802.11 standards.

The network 204 is a communications network including wireless and wired connections. The network 204 may be implemented using a cellular network (for example, a Long Term Evolution (LTE) network), a WiFi network or a combination of both. However, the concepts and techniques embodied and described herein may be used with networks using other protocols, for example, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed networks.

The electronic communications device 210 is a wireless communication device that includes hardware and software that enables the device 210 to communicate via the access point 206 to the network 206. In one example, the electronic communications device 210 includes an electronic processor 215, a memory 220, an input/output interface 225, a transceiver 230, a WiFi processor 235, a display 240 and an antenna 245. The illustrated components, along with other various modules and components are coupled to each other wirelessly or by or through one or more control or data buses that enable communication there between.

The electronic processor 215 obtains and provides information (for example, from the memory 220 and/or the input/output interface 215) and processes the information by executing one or more software instructions, modules or as part of a program that performs characterization using a modular library or codebase (for example, available bandwidth characterization application 222), capable of being stored, for example, in a random access memory ("RAM") area of the memory 220 or a read only memory ("ROM") of the memory 220 or another non transitory computer readable medium (not shown). The available bandwidth characterization application 222 may include firmware, one or more applications, program data, filters, rules, one or more program modules, and other executable instructions. The electronic processor 215 is configured to retrieve from the memory 220 and execute, among other things, software related to the control processes and methods described herein.

The input/output interface 225 is configured to receive input and to provide output to peripherals. The input/output interface 225 obtains information and signals from, and provides information and signals to, (for example, over one or more wires and/or wireless connections) devices both internal and external to the electronic communication device 210.

The electronic processor 215 is configured to control the WiFi processor 235 and the transceiver 230 to transmit and receive data to and from the electronic communication device 210. The WiFi processor 235 encodes and the decodes digital data sent and received by the transceiver 230. The transceiver 230 transmits and receives radio signals to and from various wireless communication networks (for example, the network 204) using the antenna 245. The electronic processor 215, the WiFi processor 235, and the transceiver 230 may include various digital and analog components, which for brevity are not described herein and which may be implemented in hardware, software, or a combination of both. Some embodiments, include separate transmitting and receiving components, for example, a transmitter and receiver, instead of a combined transceiver 230.

In some embodiments, the display 240 includes a touch screen display, which is a suitable touch-sensitive interface display such as, for example, a liquid crystal display (LCD) touch screens, or an organic light-emitting diode (OLED) touch screen.

In some embodiments, the electronic communications device 210 is a smart telephone. In other embodiments, the electronic communications device 210 may be a table computer, a smart watch, a portable radio, a combination of the foregoing, or another portable or mobile electronic device containing software and hardware enabling it to operate as described herein.

Figure 3:
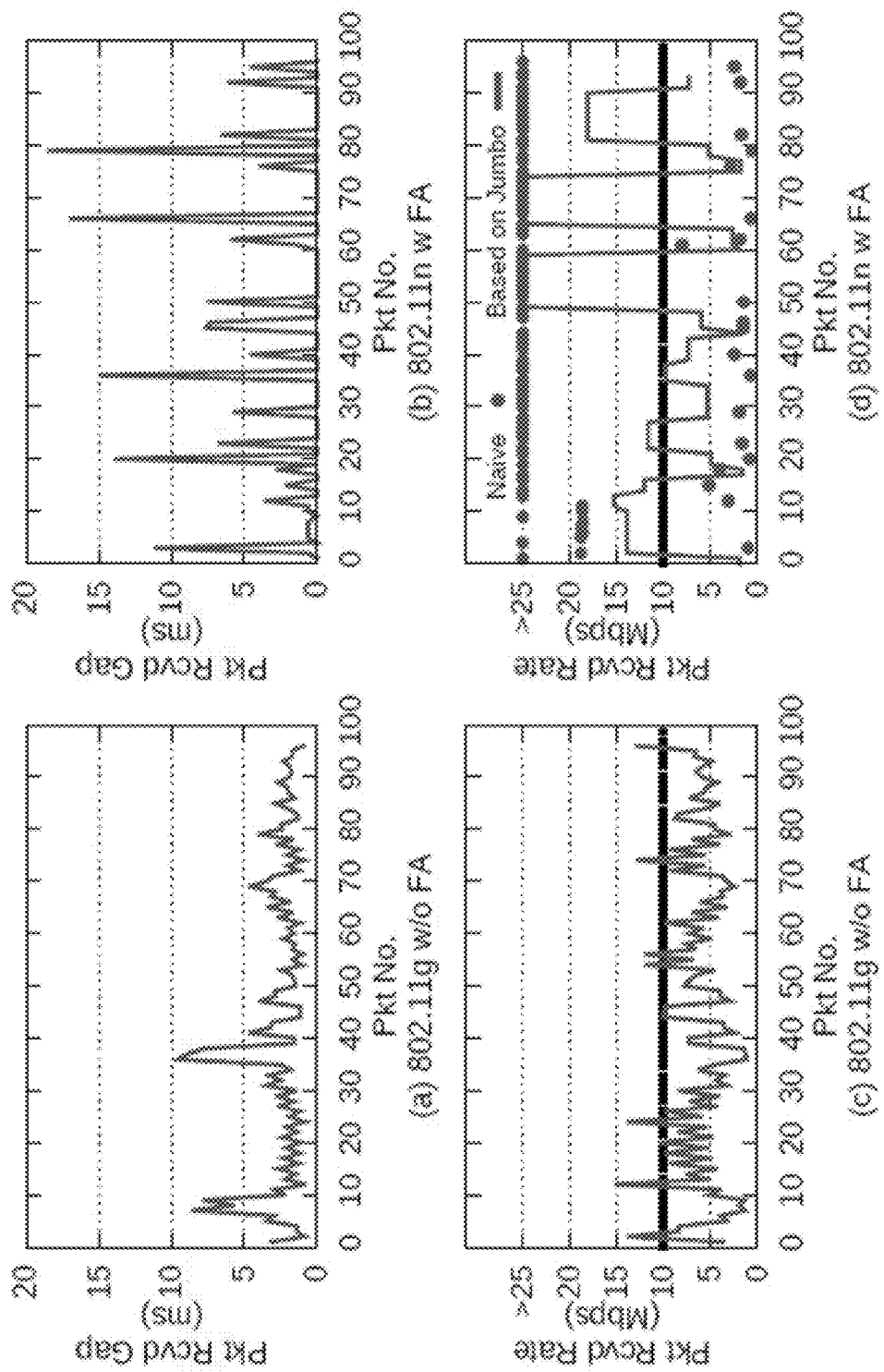
FIG. 3 illustrates the observed receiving packet gap and packet rate in a packet sequence under 802.11g versus. 802.11n.

FIG. 3 shows the observed receiving packet gap and packet rate in a packet sequence under 802.11g vs. 802.11n. The dashed line indicates the probe rate. As shown in FIG. 3, we contrast the impact of FA from 802.11n case (FIG. 3(b)(d)) with the case without FA under 802.11g (FIG. 3(a)(c)). With identical probes, the received packet gap under 802.11n (FIG. 3(b)) presents a much more bursty and bimodal pattern than under 802.11g (FIG. 3(a)). The reason is that, when frame aggregation is applied, the multiple packets that were assembled in an aggregated frame arrived at the receiver at same time. These packets appear to have negligible packet gaps between each other. When computing the packet rate, those extremely small packet gaps are translated into high packet rates. Therefore, FIG. 3(d) shows a similar bursty pattern for the naive method. Although the jumbo-based idea discussed in Farshad helps smooth the spiky pattern, the calculated packet rate presents high dynamics with unacceptably large variation. According to PRM, when passing through a congested link, the received packet rates should be consistently less than the probe rate as in FIG. 3(c). However, this principle breaks with frame aggregation. As shown in FIG. 3(d), the received packet rate hovers with over half of the received packets having a packet rate greater than the probe rate. Also, from the perspective of PGM, the majority of compressed packet gaps cannot be used to infer cross traffic anymore.

III. Exploiting Frame Aggregation for Link Characterization

While the notion that Frame Aggregation breaks Available Bandwidth estimation has been explored in Farshad, the prior approach has been to work around Frame Aggregation. In contrast, by carefully studying the characteristics of Frame Aggregation regarding probe traffic (Section III-A), it has been shown here that the frame depth of Frame Aggregation can be manipulated to detect link congestion (Section III-B).

A. Frame Aggregation Characterization

Consider a sequence of probe packets with packet size and packet gap $G_{snd}$ that are sent from a server to a client via a WiFi link with frame aggregation enabled and a data rate of $G$. We start with considering the simple case when no cross traffic is present. According to the aggregation process mentioned in earlier Section II-A, the first packet that arrives in the AP queue will be held for a pre-defined delay time $D_{ag\_ag}$ to wait for more traffic. Any probe packet that arrives during this time will be assembled into the same aggregated frame. In order to describe the degree of the aggregation, we introduce a metric-Aggregation Intensity (AI)—to denote the number of packets assembled in an aggregated frame on a WiFi link. The AI in this case can be expressed as:

$$AI = \left\lceil \frac{D_{ag}}{G_{snd}} \right\rceil \quad (2)$$

When the cross traffic is injected to compete with the probe packets, the cross traffic will introduce additional queuing delay for the probe packets. Therefore, Eq (2) can be further extended as:

$$AI = \left\lceil \frac{D_{ag} + T_Q}{G_{snd}} \right\rceil \quad (3)$$

$$T_Q = f(u_x)$$

subject to $$AI \cdot \mathcal{P} \leq \mathcal{P}_{max}, \frac{AI \cdot P}{R} \leq T_{max}.$$

where $T_Q$ is the extra queuing delay resulting from the cross traffic. $T_Q$ is a monotonically increasing function of the link utilization $u_x$ occupied by the cross traffic. Available Bandwidth can be calculated as $AB = C(1-u_x)$ with the link capacity of C. As the cross traffic load increases (AB decreases), $T_Q$ will grow as well. This will lead to more probe packets being aggregated in a frame which causes the growth of AI. Furthermore, AI has an upper bound by the maximum size $\mathcal{P}_{max}$ and maximum transmission time $T_{max}$. The function $f(\ )$ helps transform the variation of $T_Q$ to the impact reflected on the load of cross traffic. Ultimately, the relationship between AI and AB is determined by the characteristics of the function $f(\ )$ between $u_x$ and $T_Q$.

Under the batch scheduling of frame aggregation, the function $f(\ )$ does not follow a linear pattern as under FIFO scheduling. To explain the difference, we show a simple example in FIG. 4 of two groups of packets to be sent to two clients on WiFi link. The $A_i$ packet denotes the i-th packet destined to client A, and $B_i$ is destined to client B. In this particular case, since the packet at the head of queue is addressed to A, all of A's packets will be sent as an A-MPDU before B's packets. This behaves like prioritizing the A's packets over B's packets.

Figure 4:
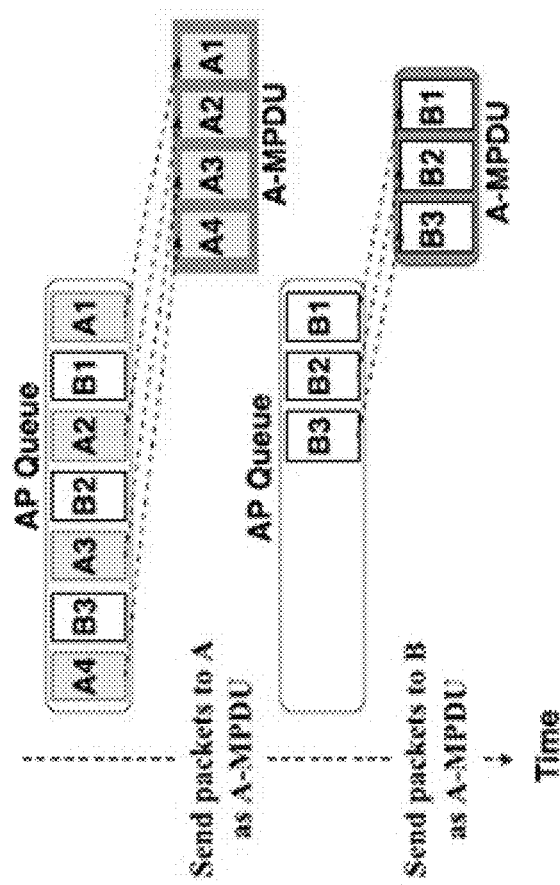
FIG. 4 is an example of scheduling under frame aggregation in accordance with some embodiments.

FIG. 4 shows an example of scheduling under frame aggregation. For the case when the probe traffic competes with the cross traffic, if one assumes the queue is not empty when a probe packet arrives, we can apply the case in FIG. 4 to consider the cross traffic packets as the A's packets and the probe packets as the B's packets. Following this process, the function $f(\ )$ can be approximated as the queuing delay of the probe packets (low-priority) with regarding to the cross traffic (high priority) load. Priority queueing systems (described by B. D. Choi, D. I. Choi, Y. Lee, and D. K. Sung in 1998 entitled "Priority queueing system with fixed-length packet-train arrivals" in IEEE Proceedings communications; and J. Walraevens, S. Wittevrongel, and H. Bruneel in 2007 entitled "A discrete-time priority queue with train arrivals," in Stochastic Models) have characterized the relationship between packet queuing delay of low-priority packets (i.e., the probe packets) and the traffic load of high-priority packets (i.e., the cross traffic). The general pattern of this function can be depicted as the curve in FIG. 5. The curve in FIG. 5 shows the probe packet queueing delay versus cross traffic load.

Figure 5:
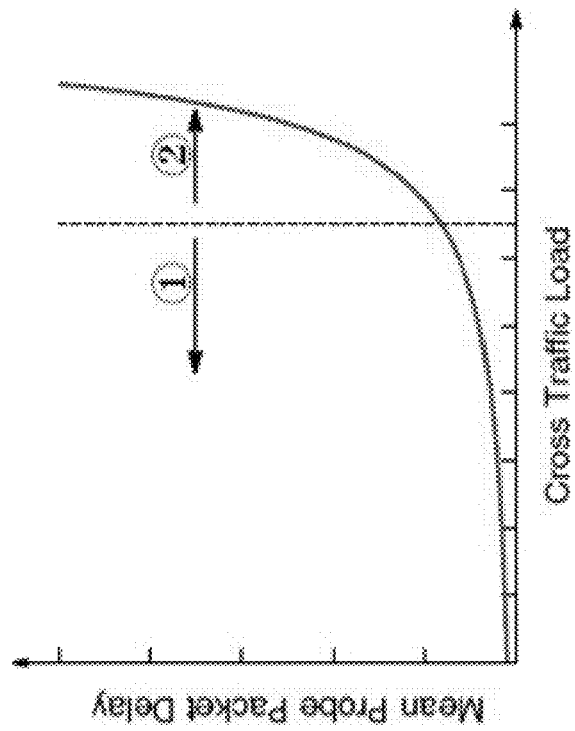
FIG. 5 illustrates a curve of the probe packet queuing delay versus cross traffic load.

The curve in FIG. 5 can divided into two zones: (a) the zone where the probe traffic load plus the cross traffic load is less than the link capacity (the probe rate $<C(1-u_x)$), and (b) the zone where the probe traffic load plus the cross traffic load is greater than link capacity (the probe rate $>C(1-u_x)$). Notably, in the first zone, the increasing slope of the packet delay with the cross traffic load is quite low. However, when the link starts to be saturated in the second zone, the queuing delay dramatically rises. By applying this pattern of $T_Q$ into AI in Eq (3), one can expect that the AI would stay relatively consistent when link is uncongested; and it will grow quickly once link congestion occurred.

Experimental Verification.

We conduct an experiment to verify the conjecture. By sending packets from a sender to a receiver via a WiFi link with a fixed packet rate, we can capture the observation of the receiver. The calculation of AI follows a threshold-based method: if two consecutive received packets have a negligibly small packet gap ($G_{rvd} < \theta$, i.e., $\theta$=400 µs), it implies the corresponding probe packets were aggregated. The AI can then be measured by counting the number of consecutive packets that are aggregated.

Figures 6, 7:
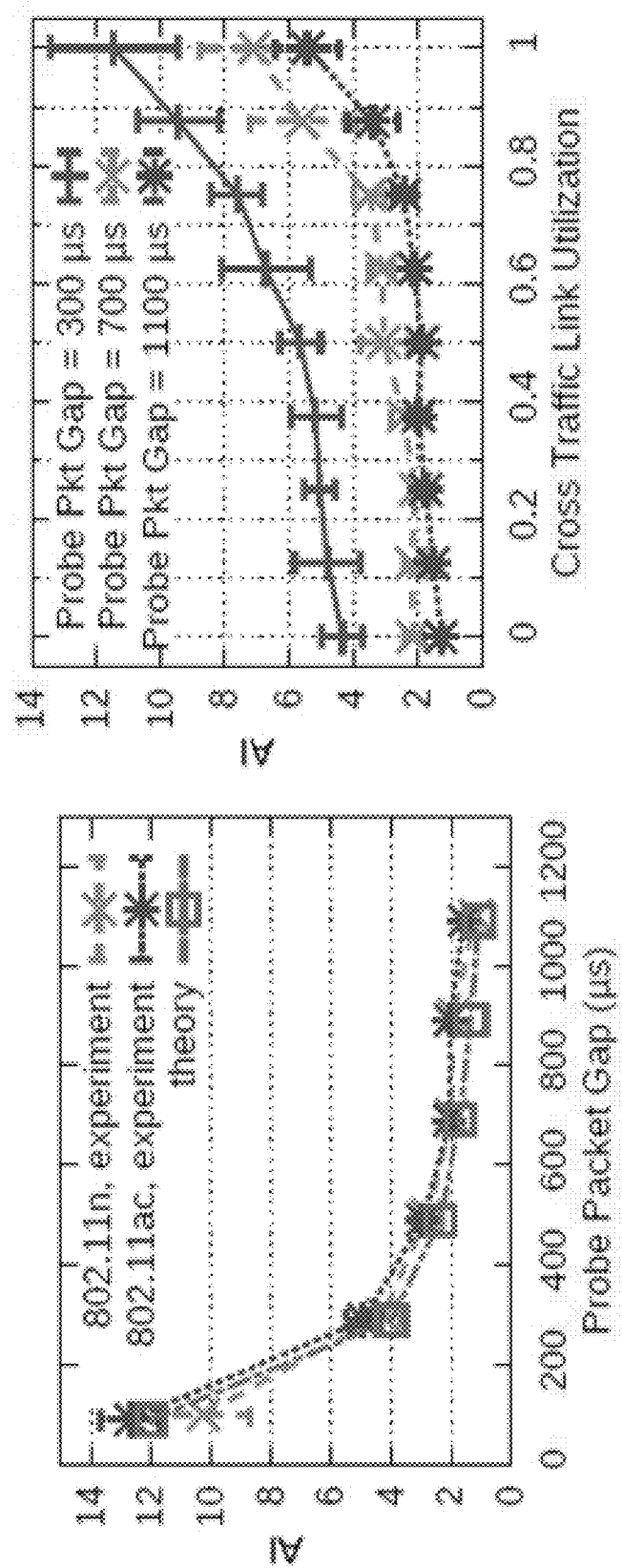
FIG. 6 illustrates curves of aggregation intensity versus probe packet gap.
FIG. 7 illustrates curves of aggregation intensity versus cross traffic load with rest to probe packet gap.

Without any cross traffic, we can vary the probe packet gap from 100 µs to 1100 µs. The probe rate is fixed to 10 Mb/s which is less than the link capacity. In order to fix the probe rate, we adjust the packet size proportionally according to the packet gap. These experiments were run under 802.11n and 802.11ac with different types of AP WiFi chips (for example, Atheros, Broadcom, Ralink). For each setting, the experiments were repeated 10 times and the mean value and standard deviation were recorded. As the general pattern of curves hold for all the WiFi chips, the result from Atheros are plotted herein. FIG. 6 shows that, when the probe packet $G$ decreases, AI rises even with no link congestion. We also plot the curve of the theoretical result by setting the value of $\mathcal{D}_{ag\_ag}$ to 1000 μs in Eq (2). As shown, both of the curves of 801.11n and 802.11ac match well with the theoretic result.

In order to add cross traffic, constant bit rate (CBR) UDP traffic is injected from the server to another WiFi client on the same AP (802.11n in this case). The probe rate of 10 Mb/s consumed roughly about 10% of the link. In FIG. 7, it can be seen that AI monotonically increases with the cross traffic link utilization $u_x$. Particularly, when $u_x$ approaches 0.9 where the probe traffic starts to saturate the link, AI rises quickly with a steep slope. This observation matches well with the tendency of function $f(\ )$ in Eq (3). Notably, with a larger packet gap setting, the zone pattern is clear. The reason is that under the WiFi environment, the queuing delay $T_Q$ is further affected by the backoff, physical layer losses, and other wireless transient impacts. The small packet gap is quite sensitive to the dynamics which results in a fast growing AI.

B. Manipulating Frame Aggregation to Detect Link Congestion

Inspired by this observation, we explore how to manipulate AI to detect link congestion. Intrinsically, by sending a probe packet sequence with packet size P and packet gap $G_{snd}$, the observed AI would lie in the first zone if the current AB is greater than the probe rate $$\frac{P}{G_{snd}}.$$

When the probe traffic exceeds the current AB and triggers link congestion, the AI would enter into the second zone and increase dramatically. Therefore, by simply checking if the observed AI increases by a certain threshold ($AI_{con}$) from the baseline value $AI_{base}$, we are able to tell if the AB of a WiFi link is less than the probe rate $$\frac{P}{G_{snd}}.$$

The expression can be summarized as follows:

$$AI - AI_{base} \begin{cases} > AI_{con} & \text{if } AB < \frac{P}{G_{snd}}, \\ \leq AI_{con} & \text{otherwise} \end{cases} \quad (4)$$

We choose to set packet gap $G_{snd}$ to be a large value such that packet gap $G_{snd} > \mathcal{D}_{ag\_ag}$. The large gap settings helps gain robustness against wireless dynamics to better utilize the pattern from FIG. 7. With $G_{snd} > \mathcal{D}_{ag\_ag}$, we intentionally force the aggregation baseline to 1, which means the packets should be separated ideally when no cross traffic is present.

Extending High Probe Rates:

In order to explore different values of AB, we must change the probe rates. With a fixed packet gap, we must vary the packet size $T_{max}$ to tune the probe rate. However, due to the constraint of the maximum transmission unit (MTU) for packet size, we are prevented from generating a higher probe rate in a single packet. To overcome this limitation, we propose a "concatenating" method: transmitting multiple (N) packets with a negligible packet gap $G_c$. With $G_c \ll \mathcal{D}_{ag\_ag}$, we deliberately force the N packets to be aggregated at WiFi link. Then the intentionally concatenated packets can be considered as a large packet with a packet size of N $T_{max}$ and the probe rate is $$\frac{NP}{G_{snd}}.$$

In this case, the aggregation baseline $AI_{base}$ becomes N. Note that this design presumes the cross traffic on wired link(s) would not break the concatenated pattern. As we assume the bottleneck link is the last hop WiFi, the concatenated packets should not be coalesced with the cross traffic on wired link (s).

Experimental Verification.

Figures 8, 9:
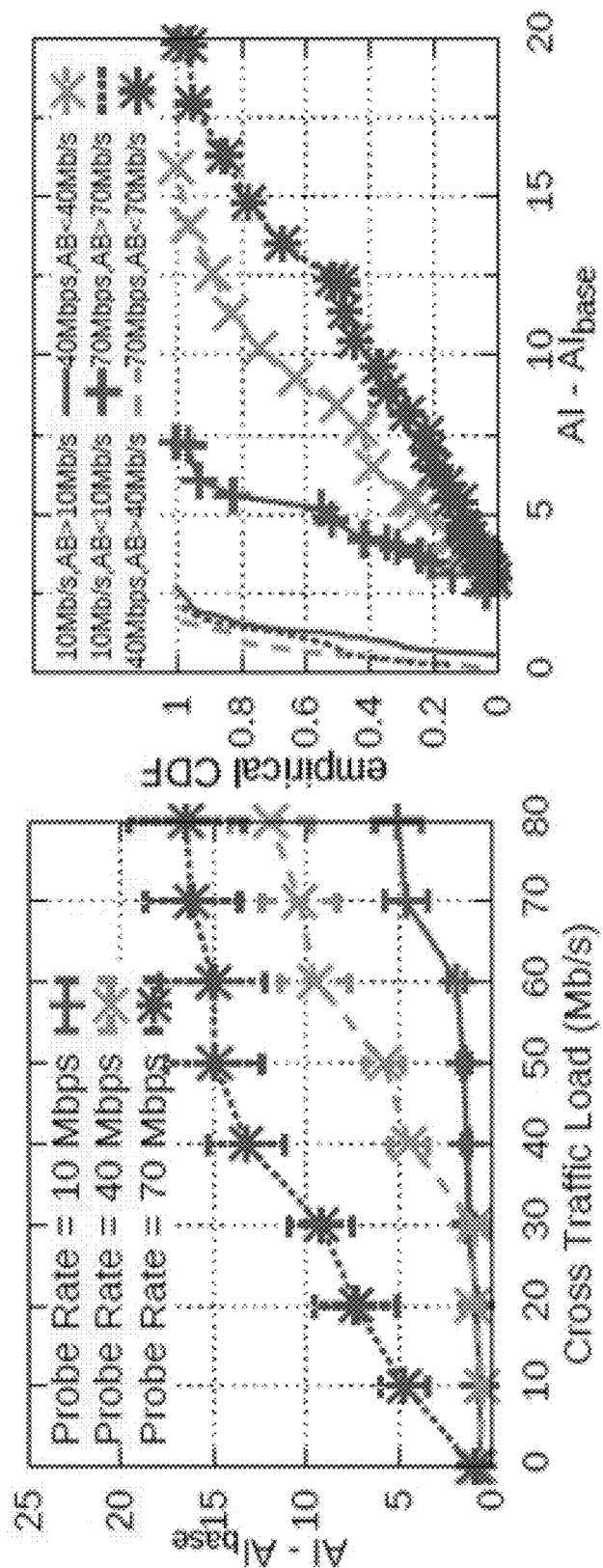
FIG. 8 illustrates $AI-AI_{base}$ versus cross traffic loaf with respect to the probe rate.
FIG. 9 shows eCDF of $AI-AI_{base}$ under uncongested link with respect to the probe rate.

With the same experimental setting as before, we evaluate the principle of AI as a link congestion indicator. Utilizing a fixed packet gap $G_{snd}$=1100 μs, we generated three levels of probe traffic with probe rates of 10 Mb/s (N=1), 40 Mb/s (N=4) and 70 Mb/s (N=7). For each level of probe traffic, we also varied the cross traffic load. FIG. 8 shows the results of the observed $AI-AI_{base}$ under the different loads of cross traffic where the link capacity is 80 Mb/s. Link congestion occurs when the probe rate plus cross traffic load is greater than the link capacity. The observed $AI-AI_{base}$ matches perfect with the theory of Eq 4. For the high $AI_{base}$ with the high probe rate, the AI can go higher than the lower probe rates. To further explore the congested and uncongested cases, we collected the trace from the experiment and plotted the empirical CDF of $AI-AI_{base}$ according to whether link congested or not. When AB is less than the probe rate, the link is congested; otherwise, the link is uncongested. As shown in FIG. 9, there is a clear separation between the congested and uncongested cases. This implies that by sending a probe sequence with probe rate R, one can detect if the current AB on a WiFi link is less or greater than R based on AI observation.

IV. Probe Packet Train Design

To utilize AI, we use the Packet Rate Model (PRM) to design a probe packet train for the purpose of AB estimation. In this section, we elaborate on the designed probe packet train and the corresponding estimation algorithm.

A. Probe Packet Train Format

Figure 10:
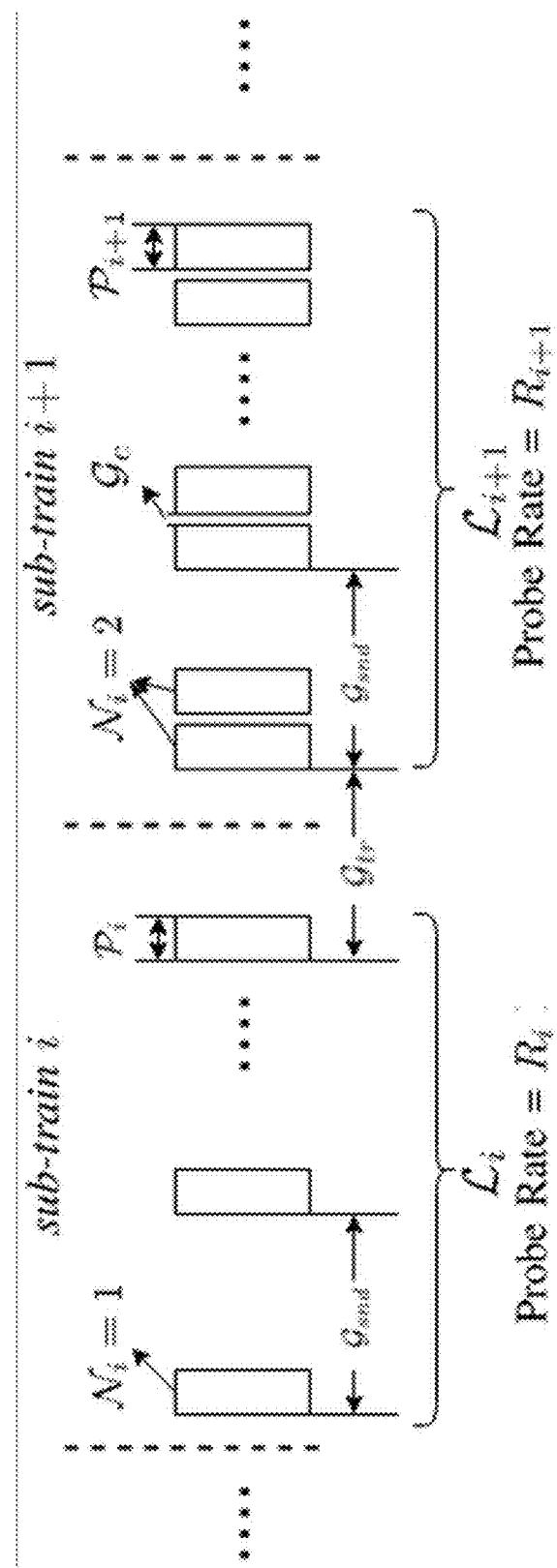
FIG. 10 illustrates an example probe packet train format with parameters labeled.

We design a probe packet train consisting of multiple sub-trains with monotonically increasing probe rates across the sub-trains. The intuition is that the problem of AB estimation can be transformed into finding the maximum probe rate sub-train that does not experience link congestion. We employ a linearly increasing pattern for the sub-train probe rates. By setting a minimum $R_{min}$ and maximum $R_{max}$ as the probate rate of the first and the last sub-train, we are able to search the potential AB in the range of ($R_{min}$, $R_{max}$). FIG. 10 plots the basic format of the probe packet train with the labelled parameters. Table I summarizes the notation and description of the design parameters. Notably, the sub-train i+1 depicts the case where the high probe rate requires concatenating multiple (N=2 in this case) packets.

TABLE I

PROBE PACKET TRAIN DESIGN PARAMETERS DESCRIPTION

| | |
|---|---|
| $G_{snd}$ | The packet gap between non-concatenated packets |
| $G_c$ | The packet gap between concatenated packets |
| $G_{tr}$ | The packet gap between neighbour sub-trains |
| M | The total number of sub-trains |
| $L_i$ | The number of packets in the i-th sub-train |
| $P_i$ | The packet size for the i-th sub-train |
| $R_i$ | The probe rate of the i-th sub-train |
| $N_i$ | The number concatenated packets to achieve $R_i$ |

B. Parameter Setting

We classify the design parameters into two groups: system-defined and customized. The first group ($G_{snd}$, $G_c$, $G_{tr}$) are set in order to satisfy the design principles. The second group (M, $\mathcal{L}_i$) can be tuned by the users for their own goals, e.g., adjusting data cost and tuning estimation resolution.

System-Defined:

We set $G_{snd}$=1100 μs to maximize the effectiveness of AI with a minimal time cost. $G_c$ is set to 20 μs to make sure the intentionally concatenated packets can be aggregated at WiFi link. In addition, due to the dynamics of WiFi links, the transient "hiccups" on a sub-train may contaminates the subsequent sub-trains as the temporal queuing effect may not be relieved immediately. In order to mitigate this impact, we add an inter-sub-train gap $G_{tr}$=2000 μs to reduce the queuing influence of a sub-train on subsequent sub-trains.

Customized:

The setting for the number of packets in a sub-train $\mathcal{L}_{i,i}$ is a trade-off between accuracy and cost. A large $\mathcal{L}_{i,i}$ can achieve high accuracy with more sample points. It also potentially injects more traffic that may disturb the existing traffic. We recommend setting $\mathcal{L}_{i,i}$ proportional to the probe rate which uses more probe packets for the higher probe rate. The number of sub-trains M decides the granularity of the test result by determining the searching step $$\Delta R = \frac{R_{max}-R_{min}}{M-1}.$$

Given a certain $\mathcal{L}_{i,i}$ a large M offers good estimation resolution but at expensive data cost.

C. Estimation Algorithm

Given the observed average AI for each sub-train, AB can be approximated by finding the maximum probe rate sub-train which did not experience link congestion. Unfortunately, the WiFi link in practice may experience some transient effects that cause AB to drop for a short period of time. In order to compensate for this noise, we designed a simple scoring-based algorithm. The intuition of the algorithm is to seek consensus across sub-trains for the observation of the link.

For the i-th sub-train, based on the Eq (4), if $AI_i-N_i<AI_{con}$ (where we substitute the $AI_{base}$ with $N_i$), then the sub-train i does not encounter link congestion so that we know AB>$R_i$ detected, we score them based on the observations of their previous sub-trains j (j∈[1, i−1], $R_j<R_i$). If the sub-train j detected AB>$R_j$ which agrees with the sub-train i, we accumulate a positive score of $$\frac{1}{(i-j)}$$

to sub-train i; otherwise, a same value of negative score is added. By assigning the weight as reciprocal of sub-train index difference, we value the consensus of the closely transmitted sub-trains more than of sub-trains far apart. Finally, AB can be approximated with the probe rate of the sub-train with the highest score. If AB is not in the range of [$R_{min}$, $R_{max}$], the result will be given as a classification: 1) if all sub-trains have AB<$R_i$, then it returns AB<$R_{min}$; 2) if AB>$R_i$ observed for all sub-trains, it returns AB>$R_{max}$.

Backward Compatible:

When the detected AI is consistently low, we assume frame aggregation is not present on the WiFi link (e.g., on 802.11g link). Therefore, the algorithm falls back to a conventional approach using the received packet rate to detect link congestion. The scoring-based algorithm can be still applied upon the sub-trains.

V. Experimental Evaluation

Implementation System:

In order to conduct further evaluation experiments, we developed a proof of concept system, AIWC (Aggregation Intensity based WiFi Characterization), based on a combination of libpcap, TCP Sting, and RIPPS. RIPPS and libpcap provide the ability for the server to create customized TCP streams of data for the probe packet train. TCP Sting is used to enable 1:1 ratio of data and ACK packets by leveraging TCP Fast Retransmit. The system allows a client to make a web request (HTTP GET) to the server that in turn will serve an AIWC probe packet train as outlined earlier. The server takes the responded ACKs to infer the timings of the probes arrived at the client. The downstream client itself is unmodified with all intelligence residing at the upstream AIWC server.

Our experimental environment was set up as follows. The AIWC client was written using a simple shell script (e.g. curl requests) and was executed on a laptop running Ubuntu 14.04 with multiple WiFi adapter options (Ralink RT3950 for 802.11g/n SISO, EdiMax EW-7822UAC for 802.11n/ac MIMO). The same setting was used for a competing client to generate cross traffic. The AIWC client the competing client were connected to a TP-LINK Archer C7 AP (802.11ac capable Access Point) with OpenWrt installed. The Access Point was connected through a local Gigabit Ethernet switch to a computer providing NeEM-based (described by S. Hemminger in 2005 entitled "Network Emulation with NetEm," in Linux Conf Au) emulation for link control. The NetEM box was used to emulate many network settings with the tc qdisc, such as delay, packet loss, rate limitation, and the like.

The AIWC server was run on a separate laptop using the aforementioned libpcap-based C++ server and was also connected to the NetEM box via Gigabit Ethernet. To emulate a real-world environment, a 40 ms round trip time was added on the path from the server to the clients. Unless otherwise noted, the probe packet train parameters were set as M=10, $\mathcal{L}_{i,i}$=max(20, 5 $N_i$). Based on experiment in FIG. 9, we set $AI_{con}$=3 for the estimation algorithm.

The cross traffic through the experiment is originated at the server to introduce congestion across the WiFi link. Cross traffic was generated by the Distributed Internet Traffic Generator (D-ITG) (described by A. Botta, A. Dainotti, and A. Pescape, in 2012 entitled "A tool for the generation of realistic network workload for emerging networking scenarios," in Computer Networks) for a fine granularity of control of packets. To obtain the ground truth of AB, an iperf3 UDP flow was used to measure the WiFi capacity. Then AB can be calculated by subtracting the throughput of cross traffic from the link capacity.

A. Cross Traffic

We begin by comparing the available bandwidth accuracy of AIWC versus prior AB estimation works, including PathChirp (described in 2003 by "V. J. Ribeiro, J. Navratil, R. H. Riedi, R. G. Baraniuk, and L. Cottrell, entitled, "PathChirp: Efficient available bandwidth estimation for network plans," in Presented at, no. SLAC-PUB-9732), Spruce (described in 2003 by "J. Strauss, D. Katabi, and F. Kaashoek, entitled, "A measurement study of available bandwidth estimation tools," in IMC '03 ACM Press), and WBest+(described in 2014 by "A. Fashad, M. Lee, M. K. Marina, and F. Garcia, entitled, "On the impact of 802.11n frame aggregation on end-to-end available bandwidth estimation," SECON, IEEE, June 2014, pp. 108-116)). PathChirp is a typical PRM (Packet Rate Model), and Spruce is a typical PGM (Packet Gap Model). WBest+ is aware of frame aggregation and is particularly designed for WiFi. All three methods were configured as specified in their respective papers (for example, Spruce requires being informed of the bottleneck capacity).

By generating different loads of CBR UDP cross traffic from the server to the competing client, we are able to vary the AB ground truth. We begin with a direct comparison by sweeping the available bandwidth across 802.11g, 802.11n and 802.11ac. Each method was run 20 times for each point. For WiFi links with different capacities, we used different AB search range for our probe packet train with ($R_{min}$, $R_{max}$): (1, 20) Mb/s for 802.11g SISO with 20 Mb/s link capacity, (10, 80) Mb/s for 802.11n 2×2 MIMO with 80 Mb/s link capacity, and (10, 100) Mb/s for 802.11ac 2×2 MIMO with 140 Mb/s link capacity.

Figure 11:
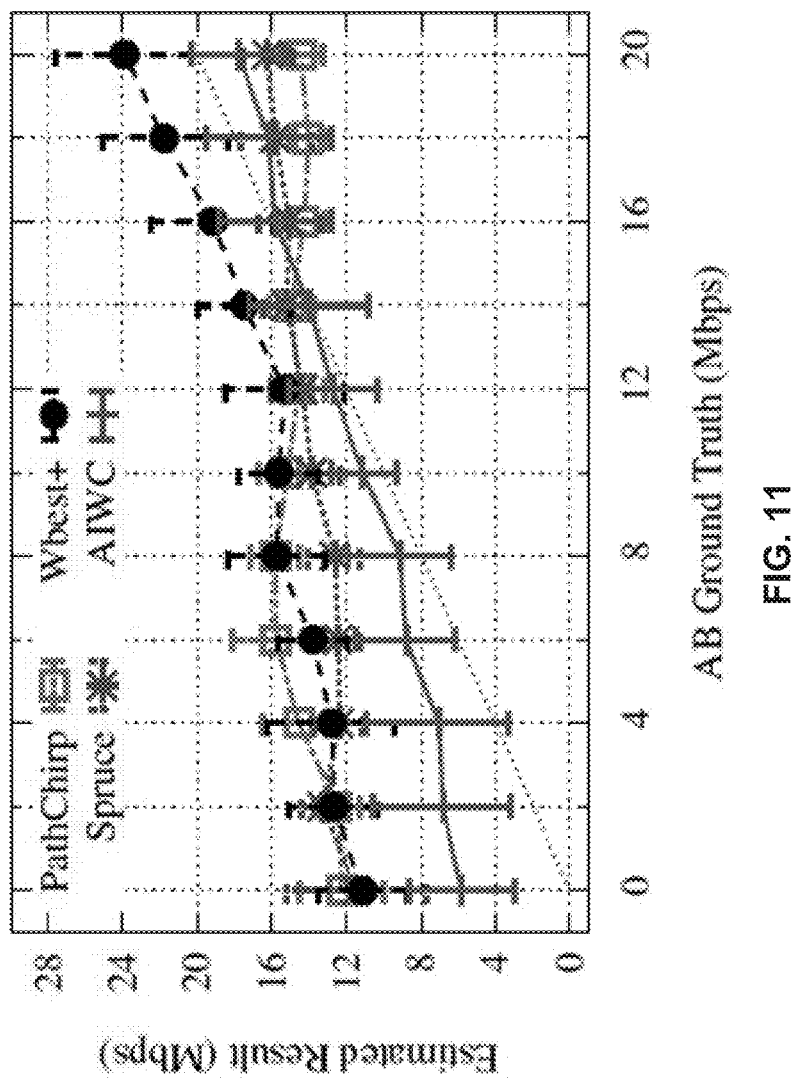
FIG. 11 illustrates curves associated with 802.11g (2.4 GHz) without frame aggregation.
Figure 12:
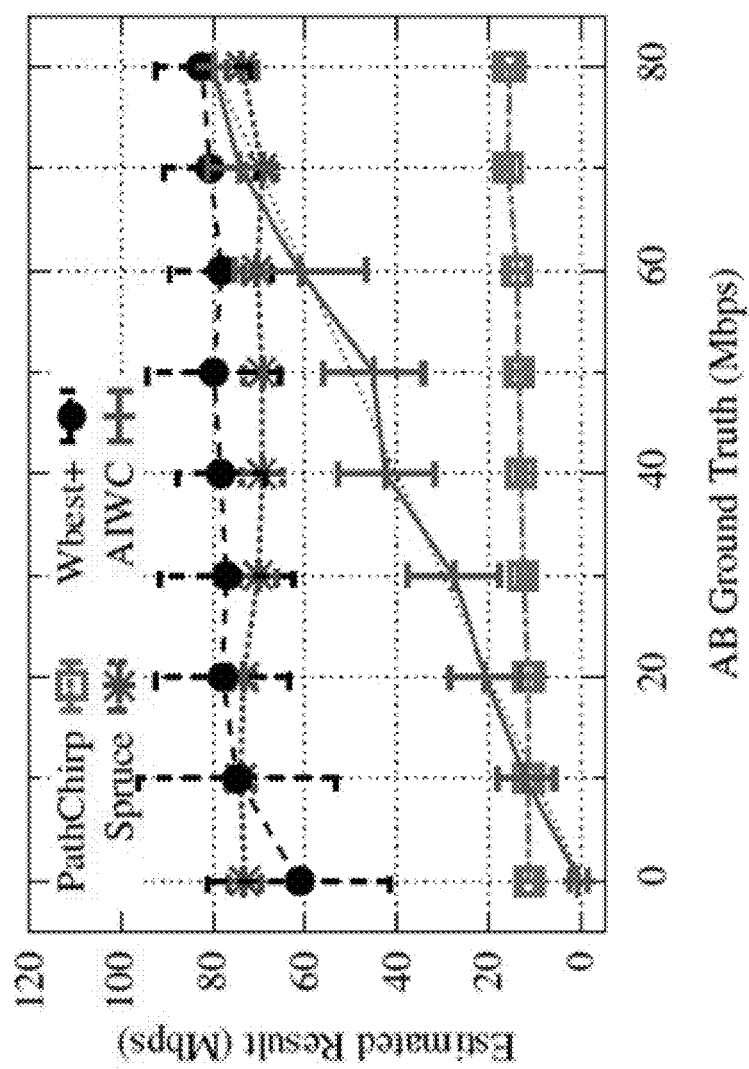
FIG. 12 illustrates curves associated with 802.11n (2.4 GHz) MIMO with frame aggregation.
Figure 13:
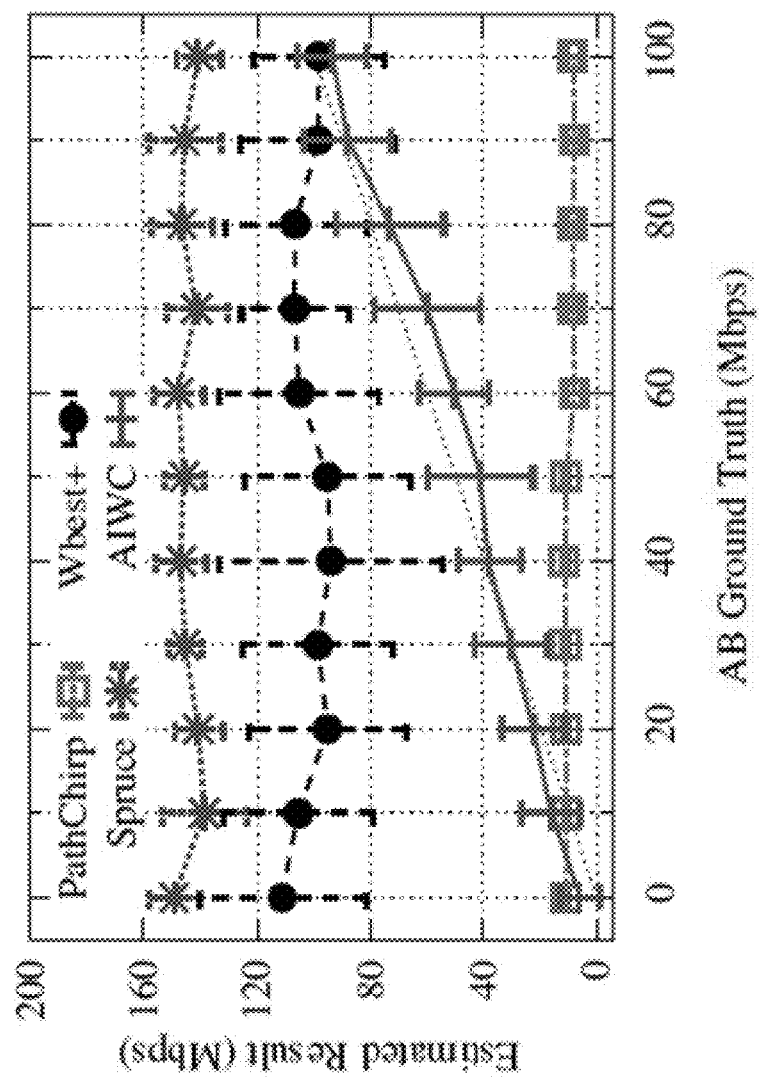
FIG. 13 illustrates curves associated with 802.11ac (5 GHz) MIMO with frame aggregation.

In FIGS. 11, 12 and 13, we plot the results relating to the ground truth for each of the methods. Note that the diagonal dashed line in the figures indicates the optimal case where the estimation result is equal to the ground truth. Starting from the case of 802.11g with no frame aggregation, shown in FIG. 11, AIWC and WBest+ show better performance. Since Spruce and PathChirp are designed specifically for wired links with targets of large bandwidths on the order of hundreds of megabits, the approaches struggle to sense the subtle AB variations on the WiFi link. For AIWC, when consistently low AI was detected, AIWC adopts the backward compatible algorithm mentioned in Section IV-C. As the target range was set to 1-20 Mb/s, AIWC achieves a fine granularity with a resolution of 2 Mb/s that helps outperform WBest+. In some embodiments, as illustrated in FIGS. 11, 12, and 13, it is difficult for all the methods to achieve high accuracy when AB is very low, for example, 0-4 Mb/s. The normal fluctuations of WiFi link capacity makes the AB in this low region difficult to be consistent.

Figure 14:
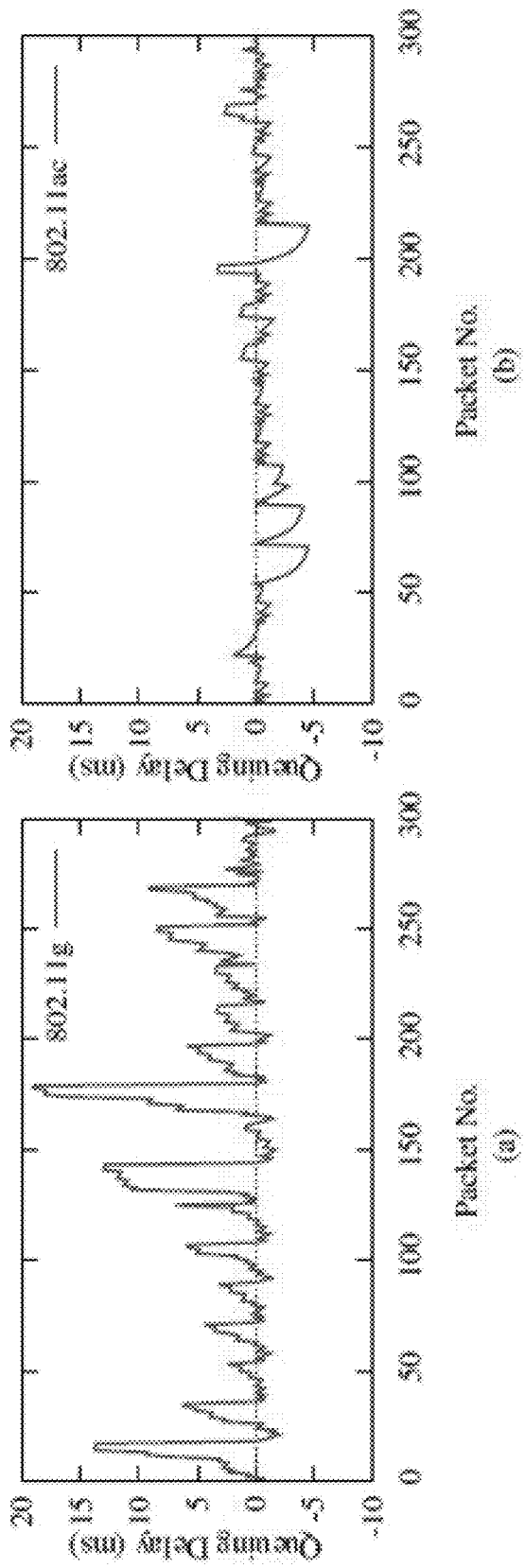
FIG. 14 illustrates queuing delay observed by PathChirp without (a) and with (b) frame aggregation.

In FIG. 12, in the presence of frame aggregation on the 802.11n MIMO link, Spruce and PathChirp are largely blind to the variations of cross traffic. Spruce as a PGM method looks for the increasing of packet gap as an indicator of link congestion. However, as the aggregation process compresses many of the packet gaps, it misleads Spruce to believe there is no cross traffic present. For PathChirp, it expects the queuing delay of probe packets should be mostly above zero as show in FIG. 14($a$). PathChirp considers the negative queuing delay as coalesced impact from severe cross traffic. When frame aggregation is adopted, it makes the majority of queuing delay show negative as shown in FIG. 14($b$), which misleads PathChirp to think the cross traffic load is significant. Therefore, PathChirp consistently returned a low AB estimation around 10 Mb/s. For WBest+, it barely reacted to the variation of AB under 802.11n/ac. This occurs due to the fact that frame aggregation heavily distorts the received rate as discussed in earlier Section II-C. As a method that relies on the received packet rate to detect cross traffic, WBest+ cannot effectively overcome the disturbing from FA even with increased number of probes. Compared to the other methods, AIWC is the only approach that reveals the changes in AB. AIWC shows the best accuracy by following closely the pattern of the ideal case (dashed line). Notably, due to the conservative design of the scoring-based algorithm, AIWC prefers underestimation rather than overestimation.

TCP Cross Traffic:

The purpose of using UDP cross traffic was to generate a consistently stable AB. However, in practice, TCP traffic is likely the major driver of cross traffic. Hence, we continue to conduct a TCP cross traffic evaluation. In contrast to the UDP CBR case, the ground truth of AB will present an on/off pattern such that when TCP traffic is on, the AB should be zero; when TCP traffic is off, the AB should equal to the link capacity. Further, the AB will be between zero and the link capacity during TCP slow start. With the same experiment settings above, we transmitted back to back TCP flows with different flow sizes. We used an 802.11ac link with 40 AB tests repeated for each flow size.

Figure 15:
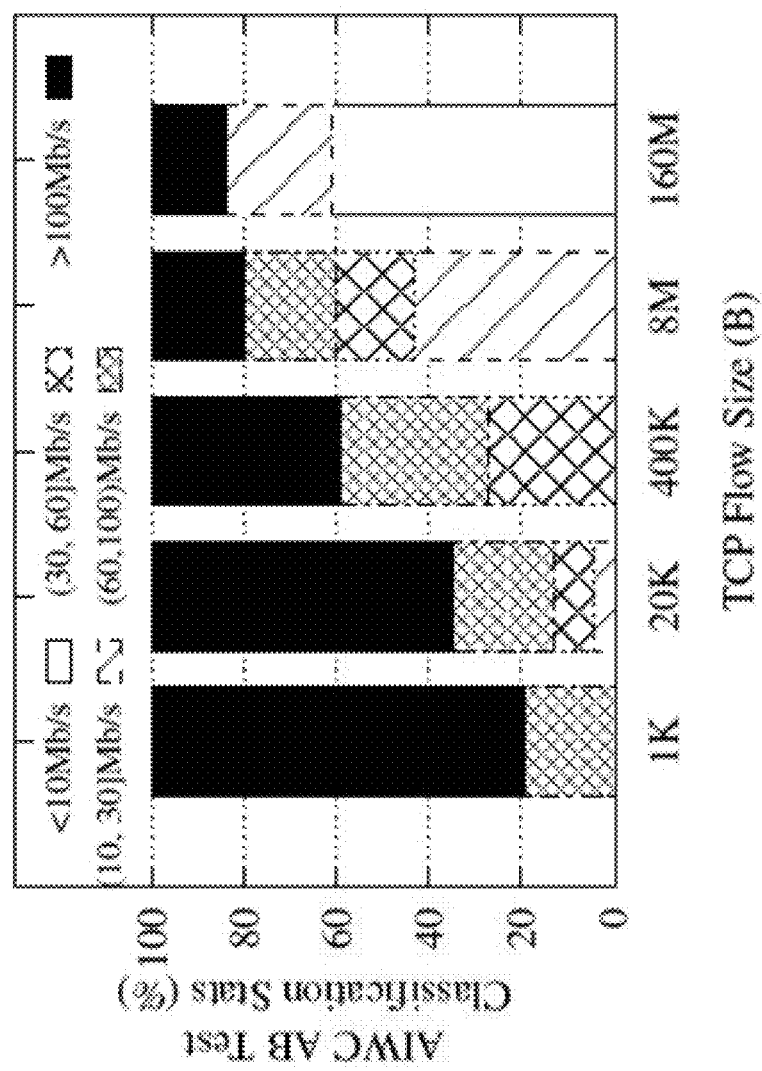
FIG. 15 shows an available bandwidth result with respect to flow size of TCP cross traffic.

As shown in FIG. 15, we plot the AB test result as class distribution by breaking down the result into five classes. Generally, the flow size will decide the time fraction of the link being saturation. When the flow size is small, the WiFi link remains largely unconsumed which leads to 80% of the AB test returning >100 Mb/s for a 1 KB flow size. When the flow size increases, the AB result moves towards the lower regions. As the flow size reached to 160 MB, 60% of tests returns AB<10 Mb/s, which implies that the link was largely saturated. The result shows AIWC can effectively reflect the impact of TCP traffic upon AB of the link.

TABLE II

COST COMPARISON ACROSS DIFFERENT METHODS

| Method | | Time (s) | Traffic (KB) | Pkts # |
|---|---|---|---|---|
| AIWC | (1, 20) | 0.18 | 167.83 | 210 |
| ($R_{min}$, $R_{max}$) | (10, 80) | 0.10 | 314.10 | 260 |
| | (10, 100) | 0.10 | 373.14 | 300 |
| Wbest+ | | 0.95 | 405.14 | 309 |
| Spruce | | 19.16 | 766.24 | 734 |
| PathChrip | | 10.36 | 305.21 | 222 |
| iperf3 (throughput test) | | 10 | 11,851.90 | 8,940 |

Cost Comparison.

By collecting measurement traces from the experiments above, we summarize the cost of each method in terms of time and traffic in Table II. With different target range settings, we further break down the cost of AIWC into multiple rows corresponding to the settings for 802.11g/n/ac. From the perspective of time cost, AIWC shows up to 9× improvement compared to the second fastest method Wbest+ and over 100× speed up compared to the traditional methods of Spruce and PathChirp. For the data cost, AIWC costs less than 400 KB across all cases. Although PathChirp consumes the least traffic, the 10 seconds time duration makes it unfavorable. To measure higher ranges of AB, AIWC increases the traffic cost while reducing the time duration. As a reference, we also put the cost of a default iperf3 test in the table. Notably, the AT test shows significantly expensive cost with over 11 MB of data and 10 seconds of time duration.

B. Interference

Due to the unlicensed nature of WiFi, AB on WiFi is decided not only by the competing traffic on the same AP but also by the interference on the same or overlapped channel. We continue by evaluating the performance of AIWC under interference. We set up another AP (interference AP) to run on the same channel as the major AP in order to generate interference. We also connected the competing client to the interference AP. By varying the traffic on the interference AP, we are able to vary the AB on the link between the major AP and the AIWC client. Similar to the case of cross traffic, we take the AB ground truth as the link capacity minus the throughput of interference traffic. The experiment was conducted on an 802.11n MIMO 2.4 GHz link.

Figure 16:
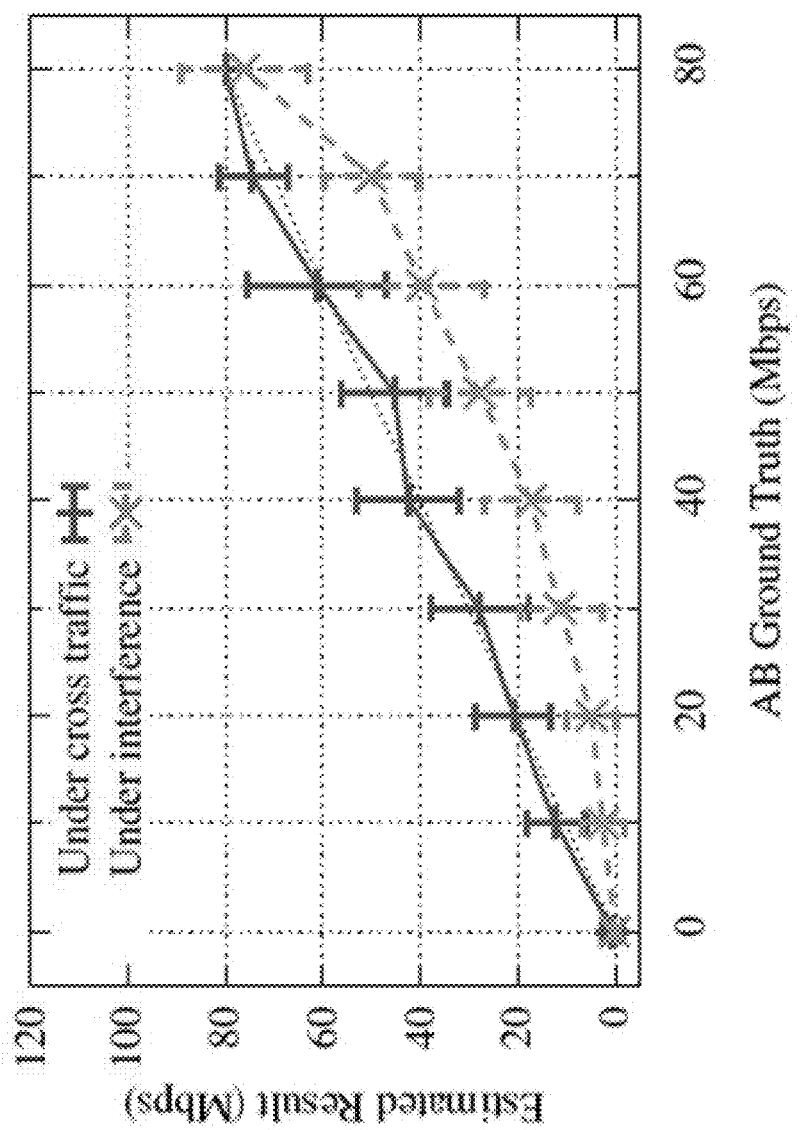
FIG. 16. illustrates an experimental result from varying cross traffic versus interference traffic.

The experiments were run for all methods but we only plot the results of AIWC in FIG. 16 as the other methods show no reactions to the changes of interference. In comparison with the cross traffic scenario, we also combine the AIWC result from FIG. 12 into FIG. 16. As shown in FIG. 16, the AB drop resulting from interference traffic is more serious than from cross traffic. This occurs because interference traffic can 1) increase the backoff waiting due to carrier sense multiple access/collision avoidance (CSMA/CA) competition between two APs, 2) induce collisions incurring physical layer retransmissions. These effects lead to longer queuing time on AP thus lower AB on WiFi link. The result shows that AIWC can still distinguish the reduced AB resulted from interference.

C. Rate Limiting

With rate limiting in public WiFi (for example, public guest WiFi), it was important to understand how AIWC would react to rate limiting. As most rate limiting is implemented by token bucket, we employed the tc qdisc htb tool to cap the maximum rate of outbound traffic of the AP. Under different settings of rate limits, we adopted the experiment setting of the cross traffic to vary the link utilization. The experiment was conducted under an 802.11ac link.

Figure 17:
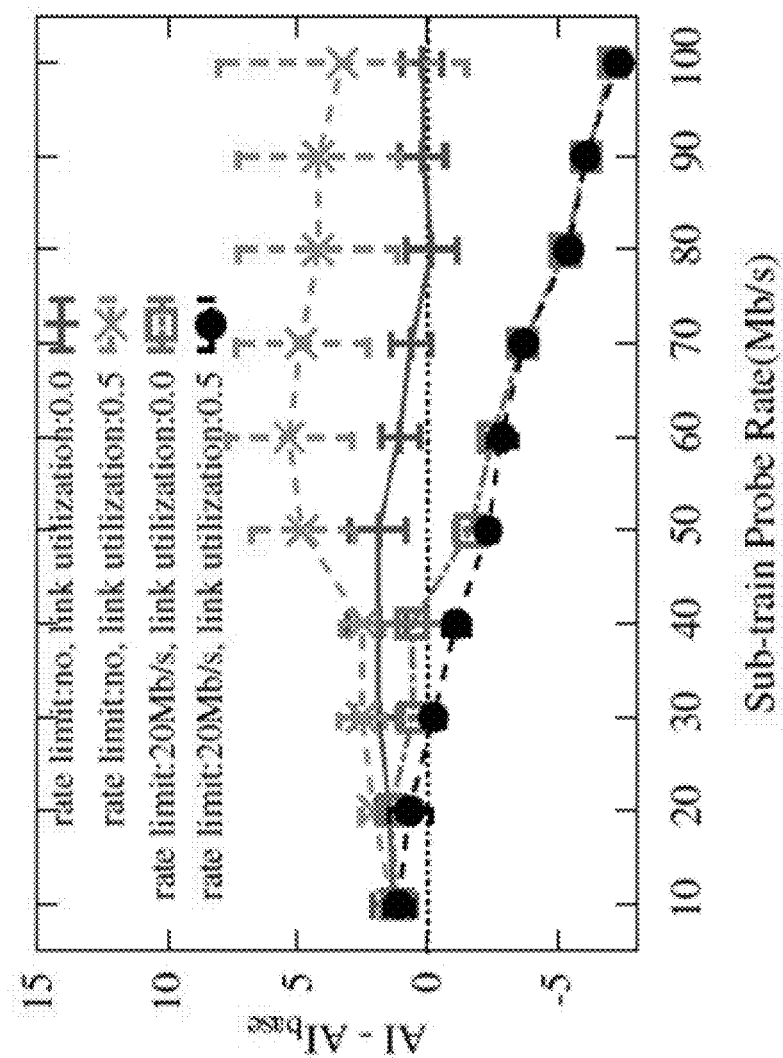
FIG. 17 illustrates curves related to $AI-AI_{base}$ of each sub-train with respect to rate limitation and link utilization.

FIG. 17 plots the $AI-AI_{base}$ for each sub-train in a (10, 100) Mb/s train. Without rate limiting, we can see the $AI-AI_{base}$ is consistently above zero, and the cross traffic can push this value higher by forcing more packets to be aggregated. With rate limiting, once a sub-train i with probe rate $R_i$ is greater than the throttled rate, the $AI-AI_{base}$ drops negative, which implies the aggregated packets (according to the concatenating approach) were torn apart. For example, under a rate limit of 20 Mb/s, the $AI-AI_{base}$ of the sub-trains whose probe rate is larger than 20 Mb/s start to go negative because the rate limitation prevents the high rate sub-trains from concatenating more packets to generate high probe rates. Therefore, the observed AI stays low while the $AI_{base}$ increases with the probe rate. As the cross traffic and the probes share the tokens of rate limiting, the cross traffic can make the negative pattern occur on even lower rate sub-trains. This observation implies that AIWC can recognize the rate limiting by detecting if the $AI-AI_{base}$ goes consistently negative.

Figure 18:
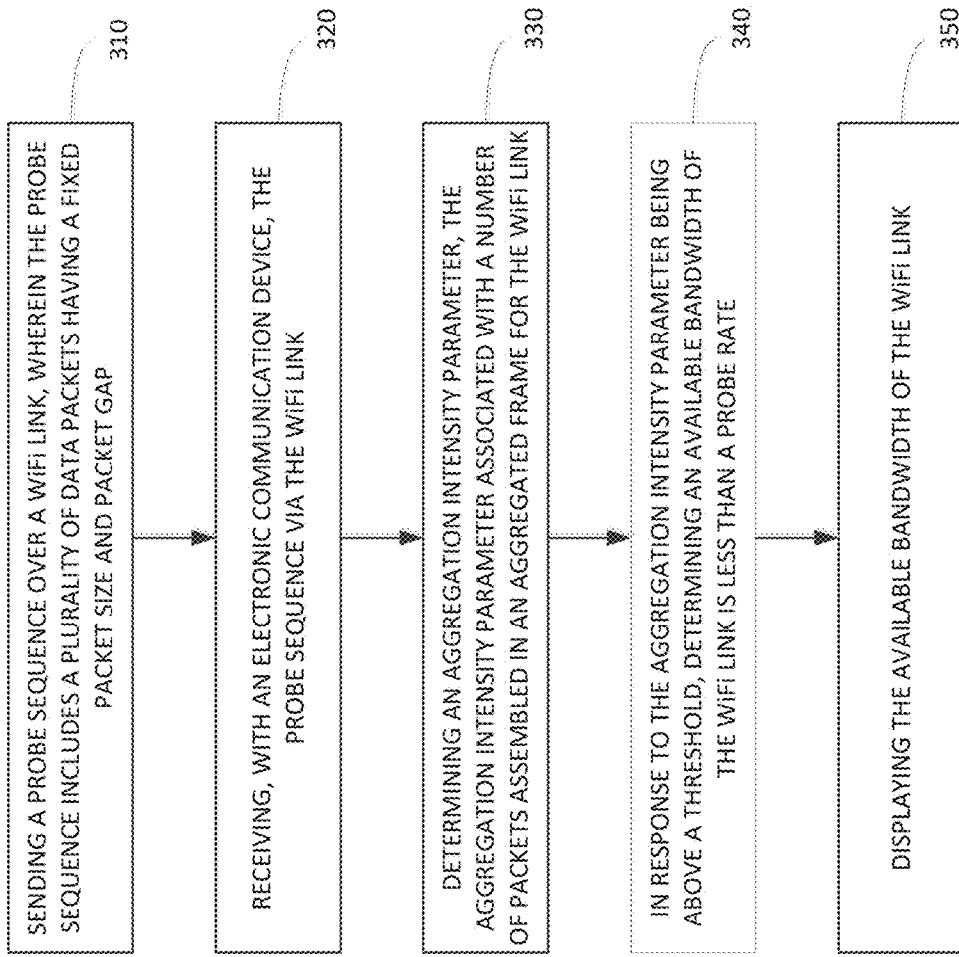
FIG. 18 is a flow chart of an example method for estimating available bandwidth in a WiFi link.

FIG. 18 is a flow chart of an example method for estimating available bandwidth in a WiFi link. At block 310, the server 202 is configured to send a probe sequence over the WiFi link connecting the access point 206 and the electronic communication device 210. In some embodiments, the probe sequence (as shown in FIG. 10) is generated at the server 202. The probe sequence includes a plurality of data packets. In one example, the data packets have a fixed packet size and packet gap between consecutive data packets in the probe sequence. In some embodiments, the electronic communication device 210 sends a HTTP GET request to the server 202. In some embodiments, the web request from the electronic communication device 210 further includes a request for a target bit rate or other parameters to select appropriate modes of operation. In some embodiments, the electronic communication device 210 is capable of choosing the highest speed to search for (for example, requests the server 202 to test for 10 Mb/s).

At block 320, the electronic communication device 210 is configured to receive the probe sequence from the access point 206, via the WiFi link. At block 330, the electronic communication device 210 determines an aggregation intensity parameter associated with a number of packets assembled in an aggregated frame for the WiFi link. In one example, the aggregated frames used for the WiFi link is in accordance with A-MPDU as specified in the IEEE 802.11 standards.

At block 340, the electronic communication device 210, in response to the aggregation intensity parameter determined in block 330 being above a threshold ($AI_{con}$, as discussed earlier) from the baseline value $AI_{base}$ as shown in the Eq (4) above, the electronic communication device 210 determines an available bandwidth of the WiFi link is less than a probe rate $$\frac{P}{G_{snd}}.$$

At block 350, the electronic communication device 210 is configured to display the available bandwidth of the WiFi link.

As mentioned earlier, the works in the PRM (Packet Rate Model) and the PGM (Packet Gap Model) approach were primarily focused on wired networks. Unfortunately, the different packet scheduling scheme under Frame Aggregation crippled the prior works that presume FIFO packet scheduling. More recently, Farshad actively attempted to engineer around Frame Aggregation on modern WiFi by sending additional probe packets to mitigate the impact of aggregation. However, due to highly fluctuating packet gap under Frame Aggregation, Farshad suffers severe performance drop especially under high transmission rate. As disclosed herein, the characteristics embedded within frame aggregation offer rich opportunities for assessing the state of WiFi links. The batch scheduling nature of frame aggregation can also capture other aspects such as queue depth, cross traffic and interference competition.

The embodiments described here may be used to rank available WiFi connections, which may be used to automatically select and connect to a WiFi connection likely providing the best QoE (for example, the optimal WiFi connection with the least current user traffic). Also, in some embodiments, the ranked WiFi connections may be displayed to a user and the user may be allowed to select a WiFi connection to connect to. As compared to other rankings that may display WiFi connection rankings based on potential peak performance, the displayed rankings, determined using the above systems and methods, display actual usable capacity that depends on current user traffic. Thus, embodiments described herein deliver a QoE rating in terms of quantified A-MPDU levels as compared to existing methods of displaying signal strength in terms of bars. Also, some embodiments described herein use passive detection so users do not have to manually initialize a test each time they want to reassess available WiFi connections.

Thus, as described above, the embodiments described herein allows a client to access information the loading on an access point to assist in the selection of an optimal WiFi link. Some embodiments also allow this process to be carried out with almost no additional overhead. With access to such detailed information about an access point, the client is able to rank the best networks available and choose (automatically or based on manual selection) which access point to connect to accordingly. In particular, the embodiments described herein may provide users with information the A-MPDU and rate levels, so that the best network can be chosen. For example, the embodiments described herein may present the load of each network to the user through access point side reporting of the A-MPDU levels of outbound packets. The client is able to do this by way of a promiscuous scan during a normal Beacon scanning process that may take place during the course of a standard WiFi connection. Thus, these embodiments allow a client to simultaneously and continuously listen for responses from available access points as well as viewing the resulting A-MPDU and rate levels of the detected access points. In some embodiments, the embodiments described here measure lading on 802.11 WiFi network. The embodiments may use passive technology and can be built into functional app versions (for example, Android or iOS) that periodically scan (for example, continuously scan 24 hours a day, 7 days a week). Accordingly, some embodiments require zero client modification. In other words, some embodiments work within existing protocols and protocol stacks, such as TCP/IP and HTTP GET. Embodiments described herein also detect loading fast with some embodiments having a resolution time of under 250 milliseconds. Embodiments also provide accurate loading measurements or rankings and may designate between red, yellow, and green rankings within 0-11 Mb/s. Embodiments are also lightweight, as some embodiments carry less than 100 KB of data.

Embodiments described herein may also be used in secondary applications. For example, embodiments may be used for cellular adaptation to handle larger aggregation windows. Embodiments may also be used for cloud adaptation, adaptive probing, actionable quality of experience, including both historical and geographic actions, or a combination thereof.

Articles "a" and "an" are used herein to refer to one or more than one (i.e. at least one) of the grammatical object of the article. By way of example, "an element" means at least one element and can include more than one element.

Unless otherwise defined, all technical terms used herein have the same meaning as commonly understood by one of ordinary skill in the art. Also it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings, and may include electrical connections or couplings, whether direct or indirect. Also electronic communication and notification may be performed using any known means including direct connections, wireless connections, etc.

It should be noted that a plurality of hardware and software based devices, as well as a plurality of different structural components may be utilized to implement the embodiments described herein. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement embodiments of the invention. For example, "mobile device" and "computing device" as used in the specification may include one or more electronic processors, one or more memory modules including non-transitory computer-readable medium, one or more input/output interfaces, and various connections (e.g., a system bus) connecting the components.

Any patents or publications mentioned in this specification are indicative of the levels of those skilled in the art to which the invention pertains. These patents and publications are herein incorporated by reference to the same extent as if each individual publication was specifically and individually indicated to be incorporated by reference. In case of conflict, the present specification, including definition, will control.

The present disclosure described herein and representative embodiments, are exemplary, and are not intended as limitations on the scope of the invention. Changes therein and other uses will occur to those skilled in the art which are encompassed within the spirit of the invention as defined by the scope of the claims.

Various features and advantages of embodiments of the invention are set forth in the following claims.

What is claimed is:

1. A method for determining available bandwidth in a WiFi link using frame aggregation between an access point and an electronic communication device, the method comprising:
    sending a probe sequence over the WiFi link, wherein the probe sequence includes a plurality of data packets having a fixed packet size and packet gap;
    receiving, with the computing device, the probe sequence via the WiFi link;
    determining an aggregation intensity parameter, the aggregation intensity parameter associated with a number of packets assembled in an aggregated frame for the WiFi link;
    in response to the aggregation intensity parameter being above a threshold, determining the available bandwidth of the WiFi link is less than a probe rate; and
    displaying, with a display, the available bandwidth of the WiFi link.

2. The method of claim 1, wherein sending the probe sequence over the WiFi link further comprises
    generating the probe sequence at a server connected to the access point via a network.

3. The method of claim 2, further comprising:
    sending, with the electronic communication device, a request to the server for receiving the probe sequence.

4. The method of claim 3, wherein sending the request to the server further comprises
    sending a HTTP GET request from the electronic communication device.

5. The method of claim 4, wherein sending the HTTP GET request further comprises
sending a request associated with a target bit rate.

6. The method of claim 1, further comprising:
sending the probe sequence over the WiFi link using 802.11 aggregated MAC protocol data unit (A-MPDU).

7. An electronic communication device for determining an available bandwidth in a WiFi link using frame aggregation between an access point and the electronic communication device, the electronic communication device comprising:
an electronic processor configured to
send a request for a probe sequence;
receive a probe sequence via the WiFi link;
determine an aggregation intensity parameter, the aggregation intensity parameter associated with a number of packets assembled in an aggregated frame for the WiFi link; and
in response to the aggregation intensity parameter being above a threshold, determine an available bandwidth of the WiFi link is less than a probe rate.

8. The electronic communication device of claim 7, wherein the request for the probe sequence is sent to a server coupled to the access point via a network.

9. The electronic communication device of claim 7, wherein the probe sequence is generated at a server coupled to the access point via a network.

10. The electronic communication device of claim 7, wherein the electronic processor is further configured to
send a HTTP GET request to a server coupled to the access point via a network.

11. The electronic communication device of claim 10, wherein the HTTP GET request includes a request associated with a target bit rate.

12. The electronic communication device of claim 7, wherein the WiFi link uses 802.11 aggregated MAC protocol data unit (A-MPDU).

13. A non-transitory computer-readable medium containing instructions that when executed by one or more electronic processors cause the one or more electronic processors to:
send a request for a probe sequence;
receive a probe sequence via a WiFi link;
determine an aggregation intensity parameter, the aggregation intensity parameter associated with a number of packets assembled in an aggregated frame for the WiFi link;
in response to the aggregation intensity parameter being above a threshold, determine an available bandwidth of the WiFi link is less than a probe rate; and
display the available bandwidth of the WiFi link.

14. The non-transitory computer-readable medium of claim 13, further containing instructions that when executed by one or more electronic processors cause the one or more electronic processors to:
generate the probe sequence at a server coupled to an access point via a network.

15. The non-transitory computer-readable medium of claim 14, further containing instructions that when executed by one or more electronic processors cause the one or more electronic processors to:
send a request to the server for receiving the probe sequence over the WiFi link using frame aggregation between an access point and an computing device.

16. The non-transitory computer-readable medium of claim 13, further comprising instructions that when executed by one or more electronic processors cause the one or more electronic processors to
send a HTTP GET request to a server coupled to an access point via a network.

17. The non-transitory computer-readable medium of claim 13, further comprising instructions that when executed by one or more electronic processors cause the one or more electronic processors to
send the probe sequence over the WiFi link using aggregated MAC protocol data unit (A-MPDU) from a server to a computing device.

* * * * *